US009808730B2

(12) United States Patent
Jenkins et al.

(10) Patent No.: US 9,808,730 B2
(45) Date of Patent: Nov. 7, 2017

(54) MULTI-FUNCTION ELECTRONIC DEVICE-ENABLED TRANSMIT CONTROLLER

(71) Applicant: TRAXXAS LP, McKinney, TX (US)

(72) Inventors: Michael S. Jenkins, Fairview, TX (US); Gary DeWitt, Plano, TX (US); Brad Shirley, Plano, TX (US); Richard Dale Rice, Jr., Wylie, TX (US); Lane Roathe, Garland, TX (US); Chris Russell, Richardson, TX (US); Larry DeFauw, Dallas, TX (US)

(73) Assignee: TRAXXAS LP, McKinney, TX (US)

( * ) Notice: Subject to any disclaimer, the term of this patent is extended or adjusted under 35 U.S.C. 154(b) by 235 days.

(21) Appl. No.: 14/266,789

(22) Filed: Apr. 30, 2014

(65) Prior Publication Data
US 2015/0015376 A1    Jan. 15, 2015

Related U.S. Application Data

(63) Continuation of application No. PCT/US2012/062613, filed on Oct. 30, 2012.
(Continued)

(51) Int. Cl.
G05B 11/01 (2006.01)
A63H 30/04 (2006.01)
(Continued)

(52) U.S. Cl.
CPC ............ *A63H 30/04* (2013.01); *G08C 17/02* (2013.01); *H04Q 9/00* (2013.01); *G08C 2201/50* (2013.01); *G08C 2201/93* (2013.01)

(58) Field of Classification Search
CPC .................. G07C 5/008; G06Q 10/063114
(Continued)

(56) References Cited

U.S. PATENT DOCUMENTS 3,705,765 A    12/1972  Fenner
5,121,863 A     6/1992  Kotitalo et al.
(Continued)

FOREIGN PATENT DOCUMENTS

CN        101505380 A       8/2009
DE   10 2007 038 666 A1    2/2009
(Continued)

OTHER PUBLICATIONS

EPO; "Extended European Search Report;" Application No. 11164210.4; Sep. 19, 2011.
(Continued)

*Primary Examiner* — Vernal Brown
(74) *Attorney, Agent, or Firm* — Daryl R. Wright; Greg Carr

(57) ABSTRACT

In an embodiment, a transmit controller capable of automatic configuration is provided. In another embodiment, an auxiliary user interface device for automatically configuring a transmit controller is provided. In another embodiment, an auxiliary user interface device for transmitting operational parameter settings is provided. In another embodiment, an auxiliary user interface device for receiving operational parameter settings is provided. In another embodiment, an auxiliary user interface device for updating an application program of a receiving device is provided.

20 Claims, 31 Drawing Sheets

Related U.S. Application Data

(60) Provisional application No. 61/553,863, filed on Oct. 31, 2011.

(51) Int. Cl.
  *G08C 17/02* (2006.01)
  *H04Q 9/00* (2006.01)

(58) Field of Classification Search
  USPC ...................................................... 340/12.5
  See application file for complete search history.

(56) References Cited

U.S. PATENT DOCUMENTS

| | | | |
|---|---|---|---|
| 5,252,965 A | 10/1993 | Gidwani et al. | |
| 5,438,936 A | 8/1995 | Wang | |
| 5,457,745 A | 10/1995 | Wang | |
| 5,555,302 A | 9/1996 | Wang | |
| 5,787,168 A | 7/1998 | Lien | |
| 5,788,202 A | 8/1998 | Richter | |
| 5,825,874 A | 10/1998 | Humphreys et al. | |
| 5,836,563 A | 11/1998 | Hsin-Yung | |
| 5,903,645 A | 5/1999 | Tsay | |
| 5,909,183 A | 6/1999 | Borgstahl | |
| 5,937,065 A | 8/1999 | Simon et al. | |
| 6,127,941 A | 10/2000 | Van Ryzin | |
| 6,133,847 A | 10/2000 | Yang | |
| 6,229,891 B1 | 5/2001 | Chen | |
| 6,293,798 B1 | 9/2001 | Boyle et al. | |
| 6,341,373 B1* | 1/2002 | Shaw | G06F 21/57 |
| | | | 709/203 |
| 6,510,517 B1* | 1/2003 | Bruhnke | G06K 7/0008 |
| | | | 380/229 |
| 6,567,012 B1 | 5/2003 | Matsubara et al. | |
| 6,658,328 B1 | 12/2003 | Alrabady et al. | |
| 6,741,684 B2 | 5/2004 | Kaars | |
| 6,785,567 B2 | 8/2004 | Kato | |
| 6,893,320 B2 | 5/2005 | Caiozza | |
| 6,944,294 B2 | 9/2005 | Tsay | |
| 6,959,899 B2 | 11/2005 | Yeh | |
| 7,080,812 B2 | 7/2006 | Wadsworth et al. | |
| 7,158,092 B2 | 1/2007 | Shen | |
| 7,174,518 B2 | 2/2007 | Kim | |
| 7,224,262 B2 | 5/2007 | Simon et al. | |
| 7,231,294 B2 | 6/2007 | Bodin et al. | |
| 7,233,844 B2 | 6/2007 | Peltz et al. | |
| 7,268,664 B2 | 9/2007 | Tanaka et al. | |
| 7,307,573 B2 | 12/2007 | Choi | |
| 7,391,320 B1 | 6/2008 | Beard et al. | |
| 7,407,143 B1 | 8/2008 | Chen | |
| 7,418,097 B2 | 8/2008 | Chang | |
| 7,486,193 B2 | 2/2009 | Elwell | |
| 7,537,190 B2 | 5/2009 | Fan | |
| 7,614,595 B2 | 11/2009 | Richter | |
| 7,681,194 B2 | 3/2010 | Van Ee et al. | |
| 7,828,259 B2 | 11/2010 | Wang et al. | |
| 7,967,262 B2 | 6/2011 | O'Brien et al. | |
| 8,136,780 B2 | 3/2012 | Lin | |
| 8,138,894 B2 | 3/2012 | Kato et al. | |
| 8,240,628 B2 | 8/2012 | Huang | |
| 8,262,070 B2 | 9/2012 | Liu | |
| 8,282,063 B2 | 10/2012 | Ou et al. | |
| 8,295,766 B2 | 10/2012 | Zimbric | |
| 8,376,301 B2 | 2/2013 | Fan | |
| 8,405,974 B2 | 3/2013 | Sayavong | |
| 8,500,080 B2 | 8/2013 | Hu | |
| 2001/0042631 A1 | 11/2001 | Carrier | |
| 2002/0007231 A1* | 1/2002 | Lohmiller | G05D 1/0204 |
| | | | 701/3 |
| 2002/0187726 A1 | 12/2002 | Yamaguchi | |
| 2003/0148703 A1 | 8/2003 | Scott et al. | |
| 2004/0018800 A1 | 1/2004 | Caiozza | |
| 2004/0077284 A1 | 4/2004 | Bonilla et al. | |
| 2004/0091102 A1 | 5/2004 | Tsay | |
| 2004/0179469 A1 | 9/2004 | Attar et al. | |
| 2004/0179678 A1 | 9/2004 | Hsu Li | |
| 2004/0203768 A1 | 10/2004 | Ylitalo | |
| 2005/0048918 A1 | 3/2005 | Frost et al. | |
| 2005/0088275 A1 | 4/2005 | Valoteau et al. | |
| 2005/0168373 A1 | 8/2005 | Mukaida | |
| 2005/0186884 A1 | 8/2005 | Evans | |
| 2005/0236536 A1 | 10/2005 | Fan | |
| 2006/0113428 A1 | 6/2006 | Choi | |
| 2006/0145039 A1 | 7/2006 | Shawver | |
| 2006/0183405 A1 | 8/2006 | Mathews | |
| 2006/0199613 A1 | 9/2006 | Almgren | |
| 2006/0259207 A1* | 11/2006 | Natsume | G06F 8/65 |
| | | | 701/1 |
| 2006/0293102 A1 | 12/2006 | Kelsey | |
| 2007/0001805 A1 | 1/2007 | Utter et al. | |
| 2007/0035412 A1 | 2/2007 | Dvorak et al. | |
| 2007/0197164 A1 | 8/2007 | Sheynman | |
| 2007/0262223 A1 | 11/2007 | Wang et al. | |
| 2007/0284500 A1 | 12/2007 | Fan | |
| 2007/0293124 A1 | 12/2007 | Smith et al. | |
| 2008/0285628 A1 | 11/2008 | Gizis et al. | |
| 2009/0017714 A1* | 1/2009 | DeRennaux | A63H 33/003 |
| | | | 446/93 |
| 2009/0061769 A1 | 3/2009 | Zimbric | |
| 2009/0195407 A1 | 8/2009 | Nakano et al. | |
| 2009/0262002 A1 | 10/2009 | Alexander et al. | |
| 2009/0294617 A1 | 12/2009 | Stacey et al. | |
| 2010/0036560 A1* | 2/2010 | Wright | B60R 16/037 |
| | | | 701/36 |
| 2010/0112897 A1* | 5/2010 | Ribbe | A63H 30/04 |
| | | | 446/454 |
| 2010/0134338 A1 | 6/2010 | Belz | |
| 2011/0057778 A1 | 3/2011 | DeWitt | |
| 2011/0288696 A1 | 11/2011 | Lefebure | |
| 2012/0015686 A1 | 1/2012 | Krupnick | |

FOREIGN PATENT DOCUMENTS

| | | |
|---|---|---|
| EP | 1736948 A1 | 12/2006 |
| EP | 1973313 A1 | 9/2008 |
| EP | 2296122 A2 | 3/2011 |
| EP | 2384796 A1 | 11/2011 |
| EP | 2416049 A2 | 2/2012 |
| JP | 5086759 A | 4/1993 |
| JP | 5106376 A | 4/1995 |
| JP | 1998-108985 A | 4/1998 |
| JP | 2001-162061 A | 6/2001 |
| JP | 2002-345050 A | 11/2002 |
| JP | 2003-087878 A | 3/2003 |
| JP | 2004-64418 A | 2/2004 |
| JP | 2005-198728 A | 7/2005 |
| JP | 2006-178338 A | 7/2006 |
| JP | 2007-251349 A | 9/2007 |
| JP | 2008-206670 A | 9/2008 |
| JP | 2009-177767 A | 8/2009 |
| TW | M395337 U1 | 12/2010 |
| WO | 2004/052484 A2 | 6/2004 |
| WO | 2010/042219 A2 | 4/2010 |

OTHER PUBLICATIONS

EPO; "Extended European Search Report;" Application No. 10175799.5; Aug. 21, 2012.

EPO; "Extended European Search Report;" Application No. 10175809.2; Aug. 21, 2012.

EPO; Extended European Search Report; Application No. 10175814.2; Sep. 6, 2012.

ISA/EP; "International Search Report and Written Opinion;" PCT/US2013/062613; Apr. 23, 2013.

ISA/EP; "International Search Report and Written Opinion;" PCT/US2012/062359; Mar. 7, 2013.

ISA/EP; International Search Report and Written Opinion; PCT/US2012/062362; Feb. 19, 2013.

Horizon Hobby; "PC Data Transfer by JR"; Aug. 2008; http://www.horizonhobby.com/Products/Default.aspx?ProdID=JRPA310#quickOverview.

(56) References Cited

OTHER PUBLICATIONS

Booker, Jim; "The JR Data Transfer Program Makes Model Setup Easy"; Horizon Hobby; Aug. 29, 2008; http://www.horizonhobby.com/Articles/Article.aspx?ArticleID=1827.
Booker, Jim; "The JR Data Transfer Program Makes Model Setup Easy"; Horizon Hobby; Aug. 29, 2008; http://www.jrradios.com/Articles/Article.aspx?ArticleID=1827.
"JR Data Transfer How to: . . . Set Up Dual Aileron and Elevator"; Transcript of video presented by Horizon Hobby Aug. 29, 2008 at http://vvww.horizonhobby.com/Articles/Article.aspx?ArticleID=1827.
Horizon Hobby; "JR PC Data Transfer Instruction Manual"; Horizon Hobby Inc., Champaign IL; Aug. 2008.
Parry, Bill; "Clip-on Wireless Telemetry from Eagle Tree Systems!", message dated Apr. 27, 2004 by 'billpa', "Bill From Eagle Tree Systems here, . . ."; http://forums.radiocontrolzone.com/showthread.php?t=165955.
Eagle Tree Systems; "Preliminary Information for the Seagull Wireless Telemetry System"; Eagle Tree Systems, Bellevue WA; Aug. 12, 2004; http://web.archive.org/web/20040812123921/http://eagletreesystems.com/News/news.html.
Eagle Tree Systems; "Wireless Telemetry and Advanced Data Recording for Model Cars/Trucks" ; Eagle Tree Systems, Bellevue WA; Dec. 20, 2005; http://www.eagletreesystems.com/Car/car.html.
Eagle Tree Systems; "Instruction Manual for the USB Flight Data Recorder"; Eagle Tree Systems, Bellevue WA; Jun. 2003.
Spektrum RC; "ModelMatch"; Horizon Hobby Inc., Champaign IL; Oct. 2009; http://www.spektrumrc.com/DSM/Technology/modelmatch.aspx.
Spektrum; "3-Channel, 4-Model Memory DSM Racing System" instruction manual; Horizon Hobby Inc., Champaign IL; Oct. 2009.
Futaba; "FASST 2.4GHz Module & R603FS Receiver" brochure; Great Planes Model Distr. Co., Champaign IL, May 2006.
Futaba; "Futaba 2.4GHz FASST System Features"; May 2007 Hobbico Inc.; http://2.4gigahertz.com/features/features.html.
Futaba; "3GR-2.4GHz System" manual; Futaba Corp., Japan, May 2007.
Futaba; "3PM w/2.4GHz FASST System" brochure; Great Planes Model Distr. Co., Champaign IL, May 2007; www.2.4gigahertz.com.
Futaba; "3PM-2.4GHz System" manual; Futaba Corp., Japan, May 2007.
Futaba; "4PK 4-Channel Computer Systems" brochure; Great Planes Model Distr. Co., Champaign IL, May 2007.
Futaba; "6EX w/2.4GHz FASST System" brochure; Great Planes Model Distr. Co., Champaign IL, May 2007.
Futaba; "6EX-2.4GHz Instruction Manual"; Futaba Corp., Japan, May 2007.
Futaba; "Futaba Model Data Converter" manual; Futaba Corp., Japan May 2008.
Futaba; "7C 7-Channel FASST Computer System" brochure; Great Planes Model Distr. Co., Champaign IL, May 2007.
Futaba; "7C-2.4GHz Instruction Manual"; Futaba Corp., Japan, May 2007.
Futaba; "12FG 12-Channel Computer Systems" brochure; Great Planes Model Distr. Co., Champaign IL, May 2007.
Futaba; "FASST Air System TM-7 RF Module and R607FS Receiver Instruction Manual"; Futaba Corp., Japan, May 2007.
Futaba; "FASST Air System TM-14 RF Module and R6014FS Receiver Instruction Manual"; Futaba Corp., Japan, May 2007.
Futaba; "FASST Air System TM-8 RF Module and R608FS Receiver Instruction Manual"; Futaba Corp., Japan, May 2008.
Futaba; "14MZ 14-Channel Computer Systems" brochure; Great Planes Model Distr. Co., Champaign IL, May 2008.
Futaba; "4PK-2.4GHz System" manual; Futaba Corp., Japan, May 2008.
Futaba; "Manual Changes—Instruction Manual—Throttle-cut function"; Futaba Corp., Japan, May 2008.
Futaba; "R6004FF" receiver manual; Futaba Corp., Japan, May 2008.
Futaba; 10CAP/10CHP/10CP 10-Channel Radio Control System Instruction Manual; Futaba Corp., Japan, May 2008.
Futaba; "3PM-X 3-Channel 2.4GHz FASST Computer System" brochure; Great Planes Model Distr. Co., Champaign IL, Hobbico Inc. May 2009.
Futaba; "3PM-2.4G Mx 3-channel FASST Radio control system for car Instruction Manual"; Futaba Corp., Japan, May 2009.
Futaba; "8FG FASST 8-Channel 2.4GHz Computer System" brochure; Great Planes Model Distr. Co., Champaign IL, Hobbico Inc. May 2009.
Futaba; "8FG 8-Channel Radio Control System Instruction Manual"; Futaba Corp., Japan, May 2009.
Futaba; 10CAG/10CHG/10CG 10-Channel Radio Control System Instruction Manual; Futaba Corp., Japan, May 2009.
Futaba; "Wireless Trainer System WTR-7 Instruction Manual"; Futaba Corp., Japan, May 2009.
Futaba; "R6108SB S.BUS compatible/FASST-2.4GHz (Multi-ch) system 8 channels/high-speed receiver" manual; Futaba Corp., Japan, May 2010.
Futaba; "S.BUS Decoder SBD-1 Instruction Manual"; Futaba Corp., Japan, May 2010.
Futaba; "S.BUS Servo Usage Precautions" manual; Futaba Corp., Japan, May 2010.
Futaba; "S.BUS System Channel Changer SBC-1 Instruction Manual"; Futaba Corp., Japan, May 2010.
Futaba; "We Put the Future of R/C in Your Hands" catalog; Hobbico, Inc., May 2010; futaba-rc.com, www.2.4gigahertz.com.
Horizon Hobby; "QuickConnect Voltage Recovery System for DSM2 Air receivers"; Horizon Hobby, Inc.; Dec. 1, 2008. https://www.spektrumrc.com/Articles/Article.aspx?ArticleID=1855.
RC Universe; "Spektrum Receiver new "Quick Connect" feature"; www.rcuniverse.com/forum; 12-18-2007. http://www.rcuniverse.com/forum/jr-radio-spektrum-radios-116/6773703-spektrum-receiver-new-quick-connectfeature.html#post6773703.
Spektrum; "Spektrum DX6i • Radio Programming Guide"; Horizon Hobby, Inc.; Aug. 2009. http://www.spektrumrc.com/ProdInfo/Files/SPM6600-Manual_DX6i.pdf.

* cited by examiner

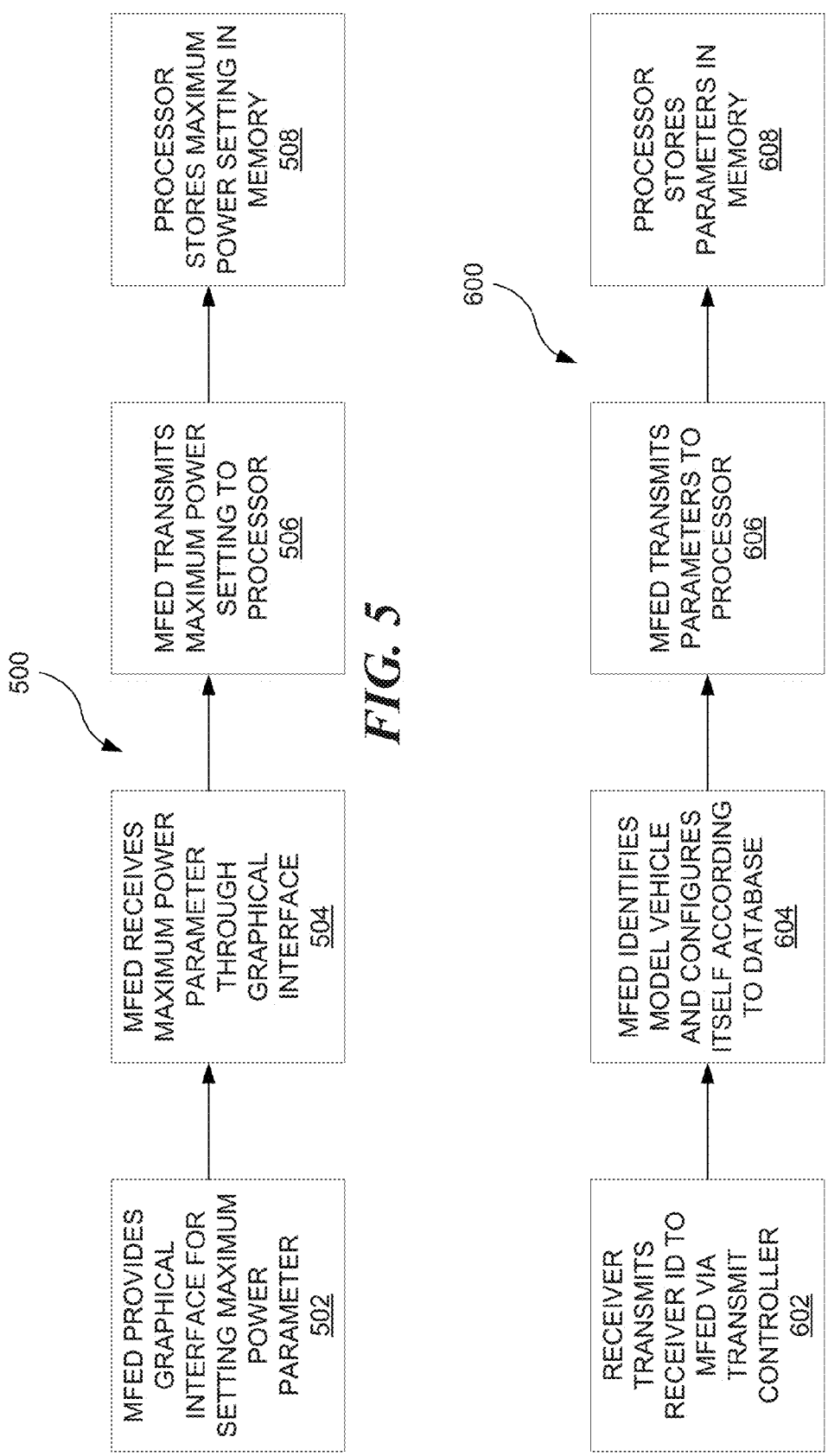

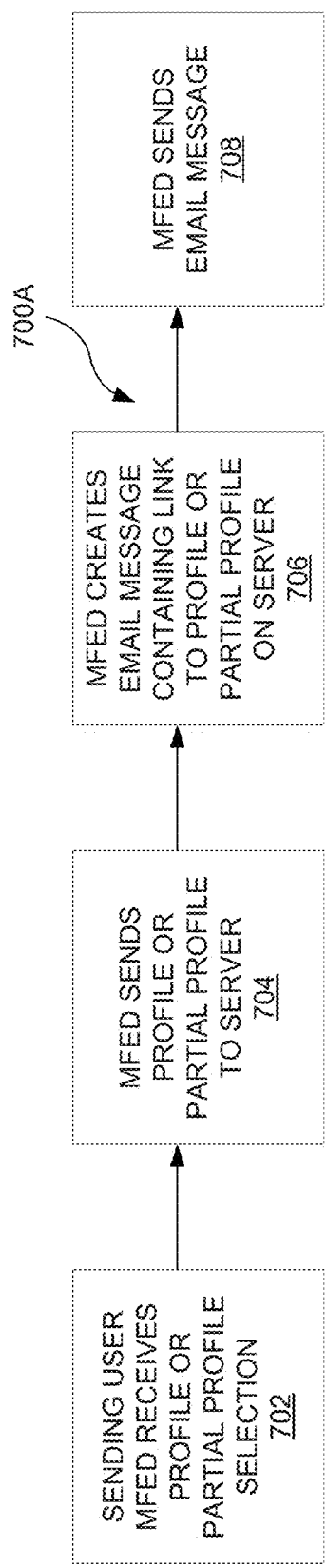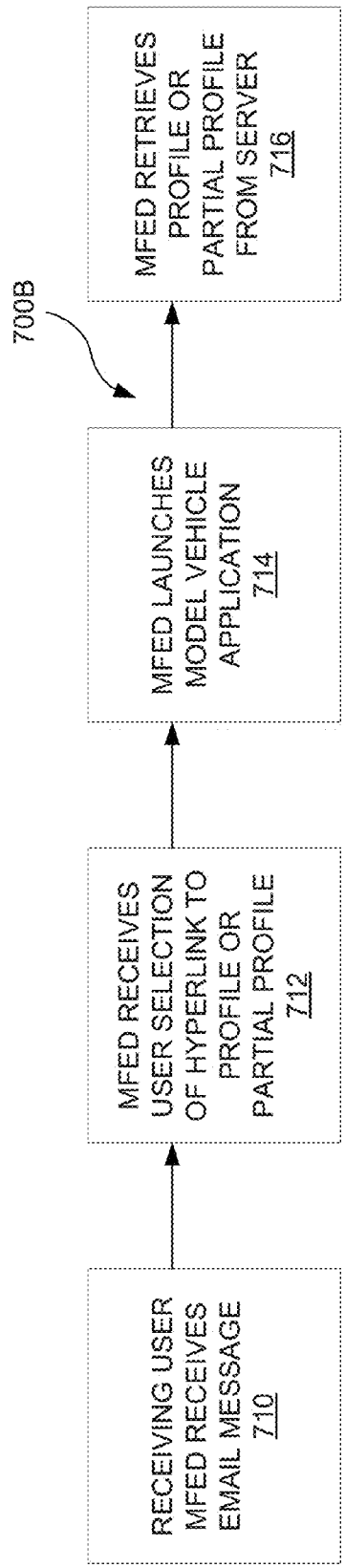
FIG. 7A
FIG. 7B

Add Sensors to Traxxas Link By Auto Detection

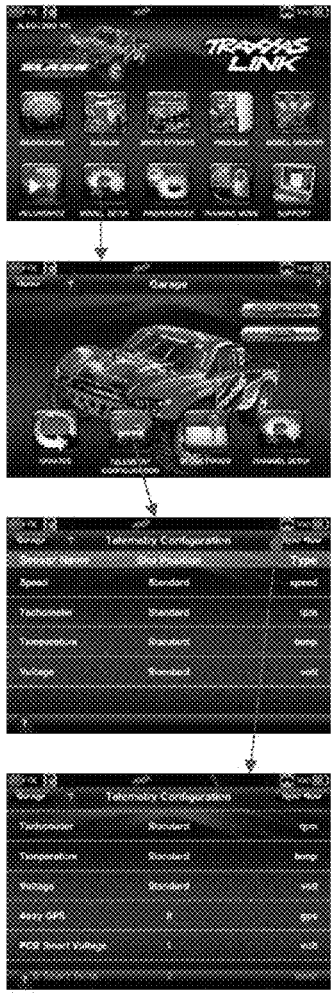

- Install Expander and Smart Sensors in Vehicle
- Bind TX and Vehicle
- Power Cycle TX and Vehicle
- Go to Home Screen
- Tap on Garage

- Tap on Telemetry Configuration

- Telemetry Config Screen Lists Standard Sensors
- Tap on Sync to Automatically Detect Smart Sensors

- Up to 7 additional Smart Sensors are Now Listed and can be Named
- The User is Now Ready to Assign Sensors to Gauges (Next Slide)

FIG. 13A

Creating New Gauges and Assigning Sensors

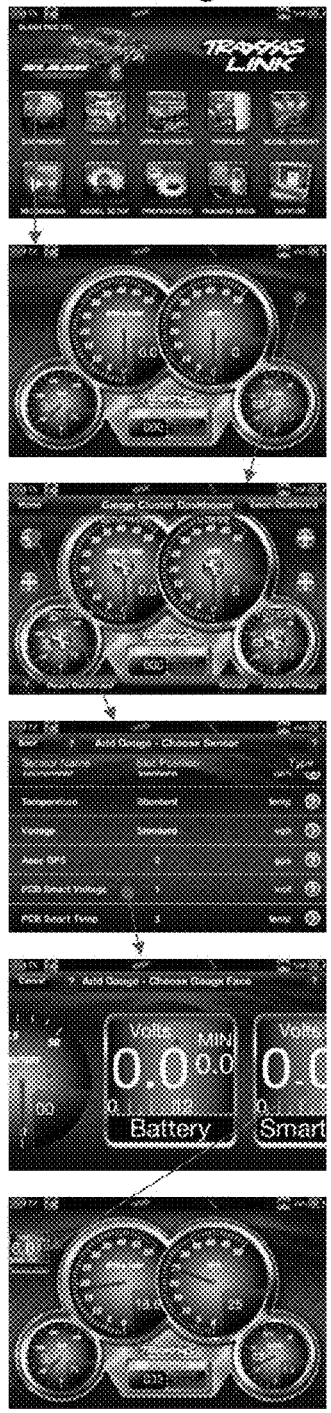

- Make Sure Sensors Have Been Auto-Detected and Sync'd with Traxxas Link and the TX and Vehicle are Powered Up
- From Home Screen, Tap Dashboard

- Tap Anywhere on the Dashboard to Momentarily (about 3 seconds) Display Available Gauge Sockets (annotated by plus signs)

- Tap on One of the Empty Sockets within 3 seconds to Add a Gauge

- First Select the Sensor for the Added Gauge (For example "Smart Voltage")

- Select a Gauge Face from a filtered list of Gauge Faces (voltage type in this example)

- The Gauge is added to the Dashboard and Ready for Operation

NOTES: Repeat the last 4 Steps to add remaining gauges. Change a Gauge by Deleting the Current Gauge and Adding a New New One. Each Smart Sensor has a Global Unique ID (GUID) that is virtually attached to the gauge. The User can now disconnect the sensors and plug them back into the Expander in any order and the sensors will be correctly routed back to the assigned gauge.

FIG. 13B

All New Sensors Added and Named

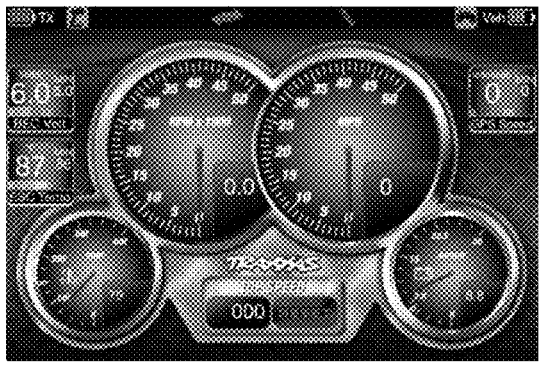

- Follow the last four Gauge Add steps to add the remaining gauges

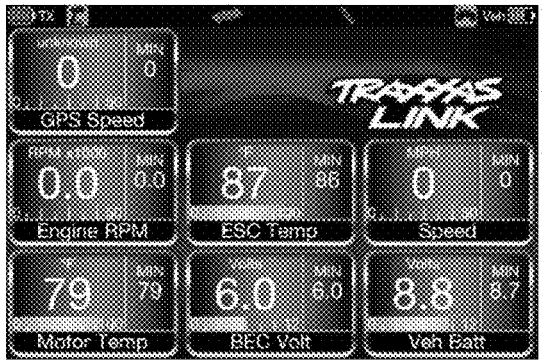

- Do the same for the Grid Dashboard

NOTES: Gauges can be customized for warning thresholds (visual, tactic, and audio feedback). Grid type gauges can be set to capture min, max, or avg values of the sensor. Ranges can be set for the grid gauges. The dashboards can be recorded for up to 30 minutes of continuous data and replayed at a later time (including background audio). Instant Replay of the last 60 seconds of operation is also available (without background audio). Telemetry is collected and displayed at 10X per second. A .csv file of all gauge data is saved during every recording for later analysis.

FIG. 13C

Training Mode Screen Flow

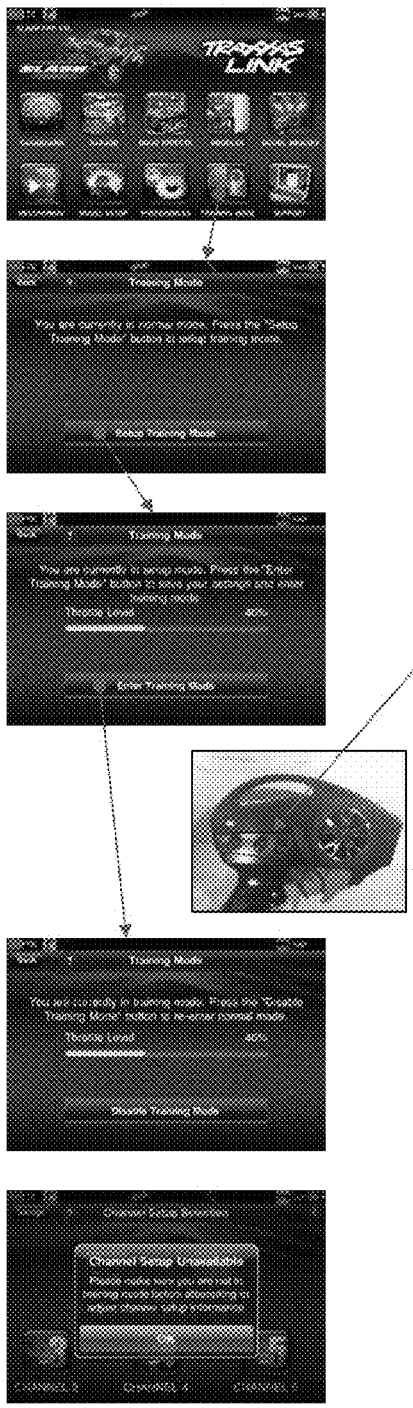

- Make sure the TX is powered up and connected to the iPod. Tap Training Mode on the Home Screen

- The User is prompted that the system is in Normal Mode

- Tap on "Setup Training Mode"

- The User is then able to use the multi-function knob on the transmitter to set the desired % throttle level.

- Once the desired throttle is set, the User taps "Enter Training Mode"

- The Green LED on the TX starts blinking indicating the system is in Training Mode

- Use of certain settings is blocked (like Channel Setup) while in Training Mode NOTES: Training Mode can also be started or stopped on the TX. The TX notifies the Traxxas Link software if modes are changed on the TX once per second

FIG. 14

FIG. 16.A
FIG. 16.B

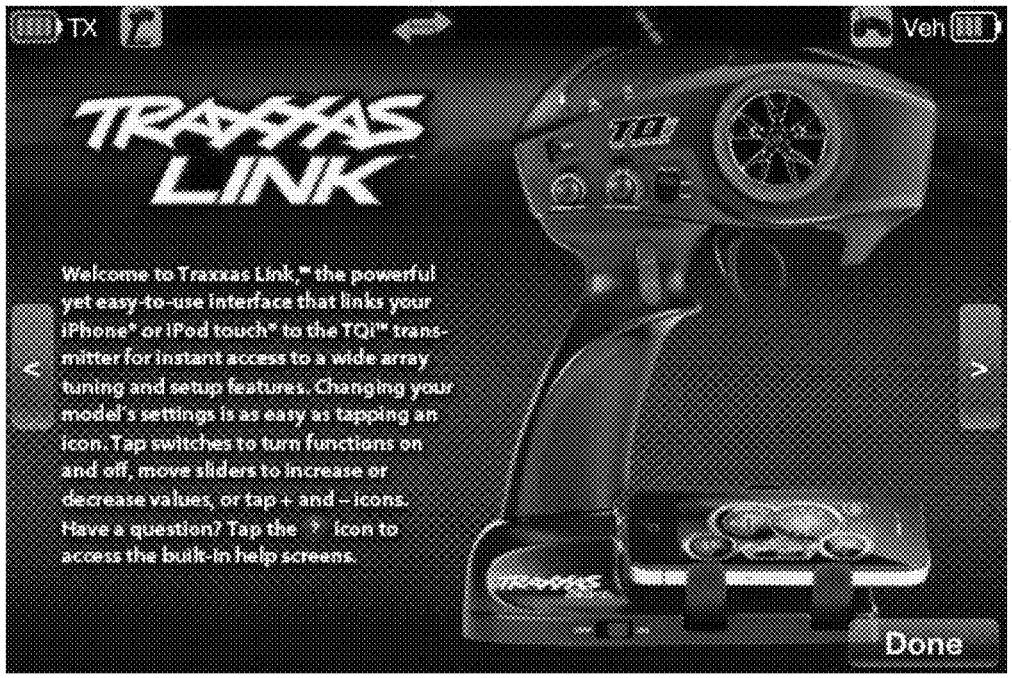
FIG. 16.C
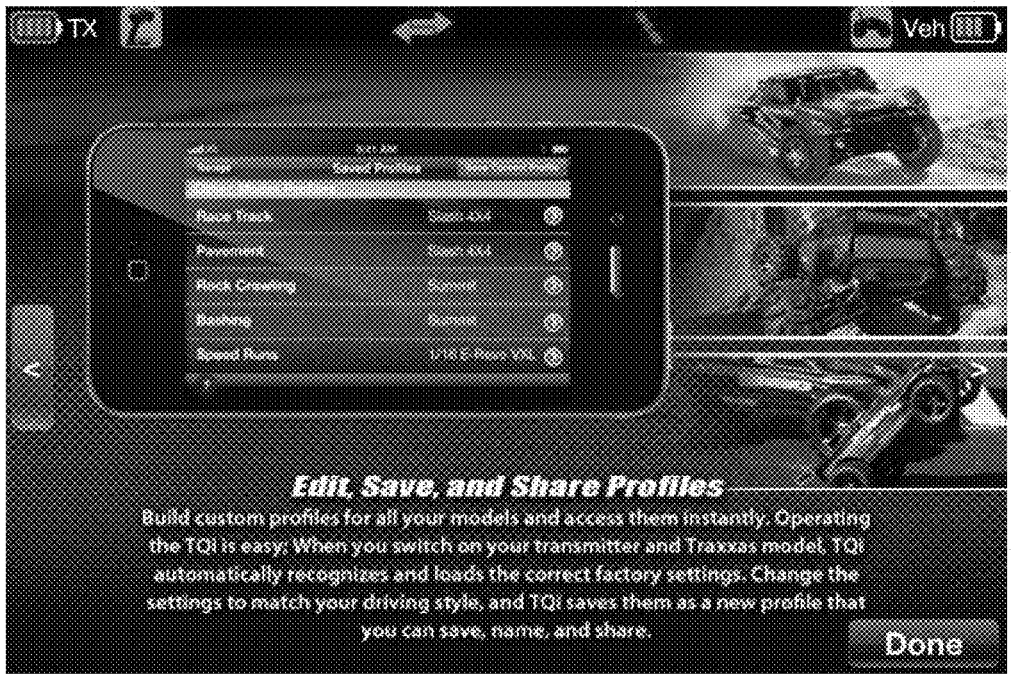
FIG. 16.D

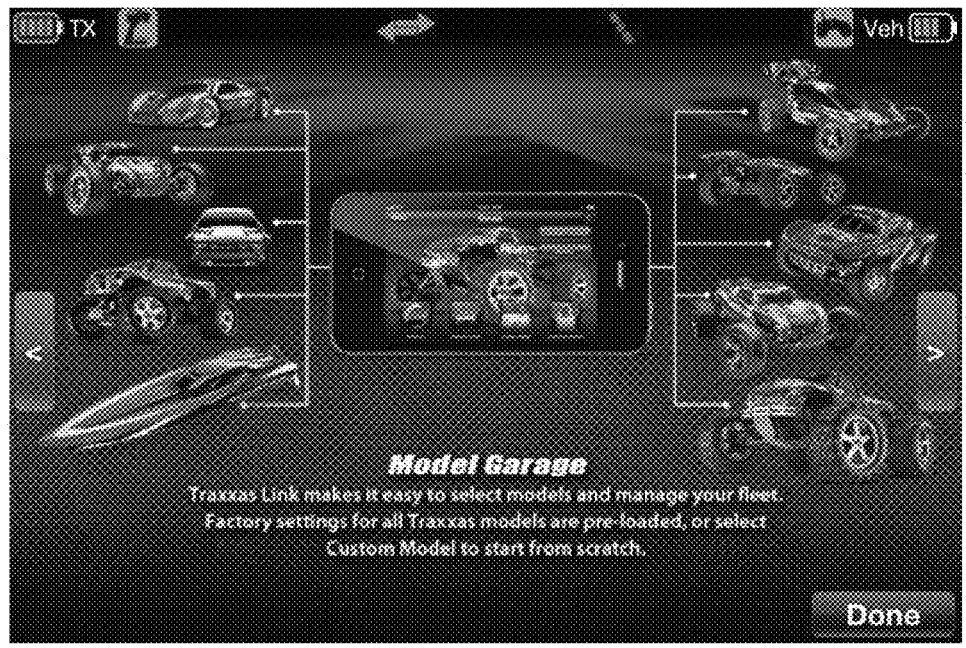
FIG. 16.E
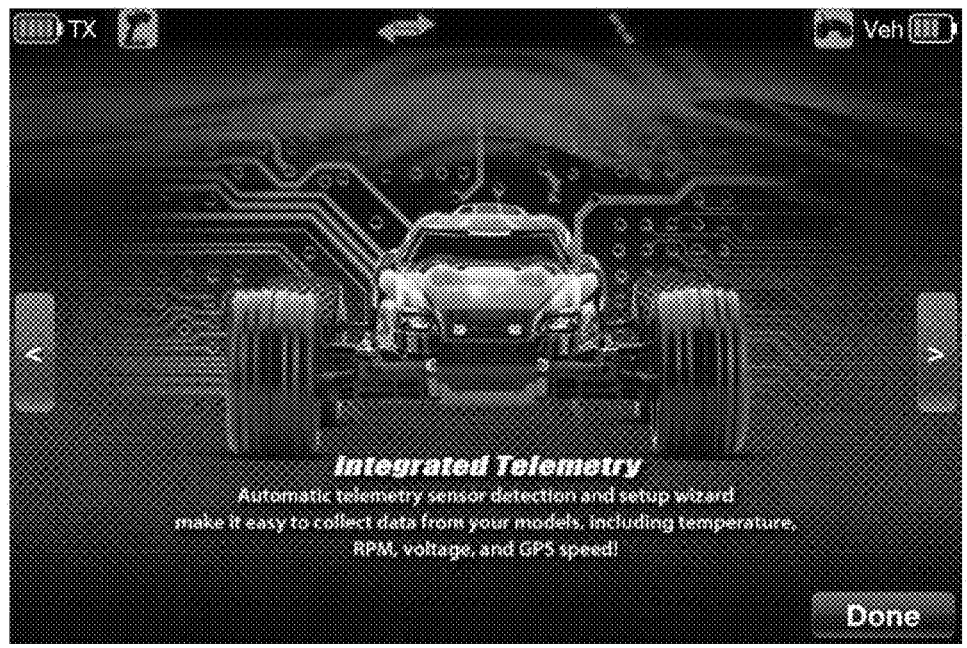
FIG. 16.F

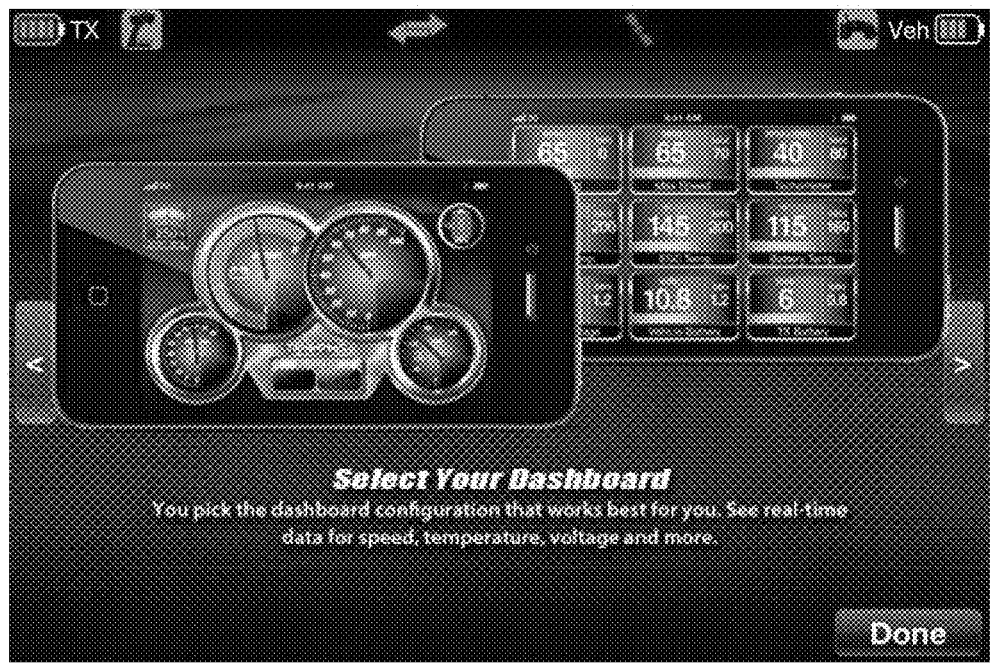
FIG. 16.G
FIG. 16.H

9 FIG. 16.I
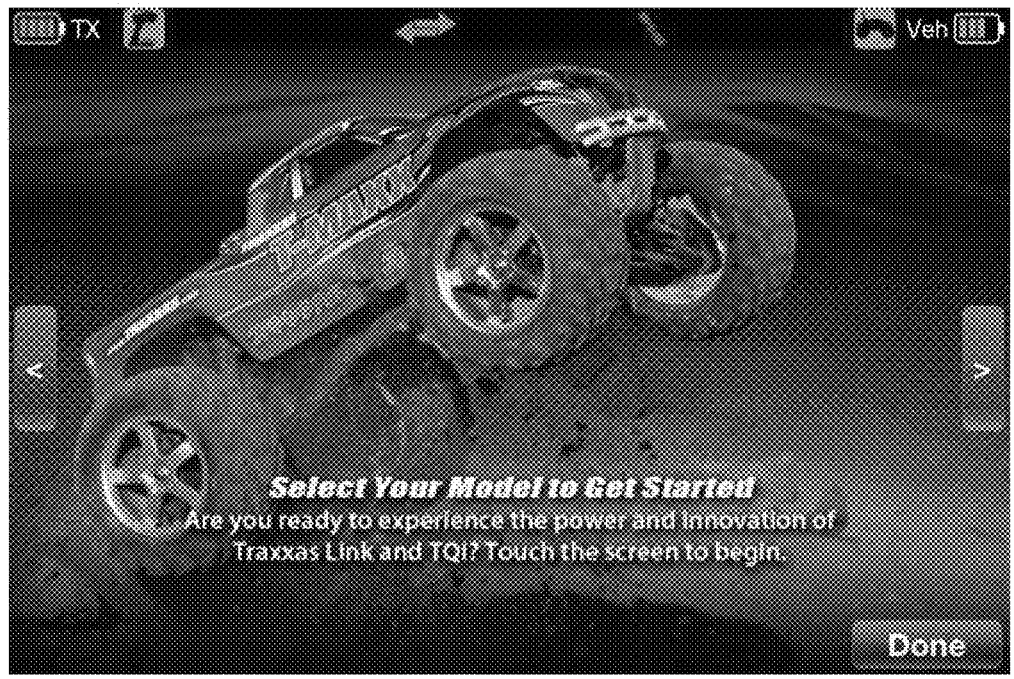
10 FIG. 16.J

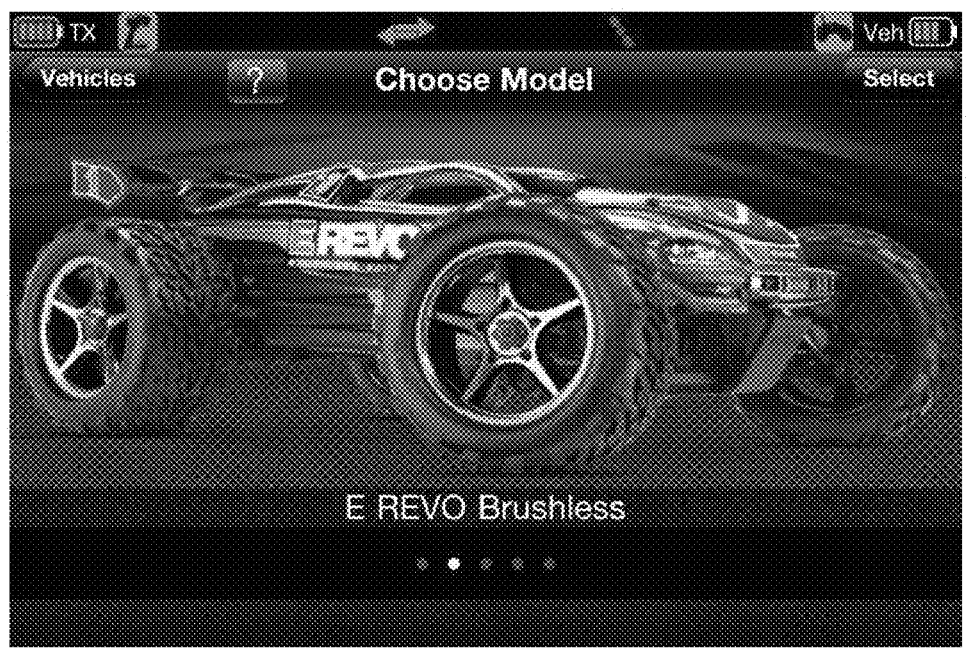
FIG. 16.1K
FIG. 16.L

FIG. 16.M
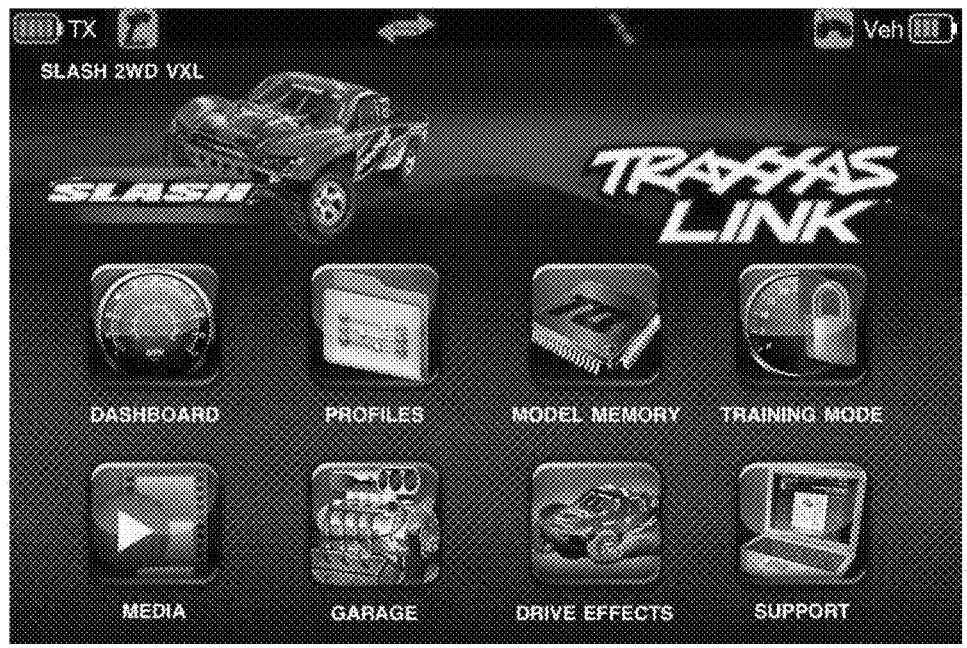
FIG. 16.N

FIG. 16.O
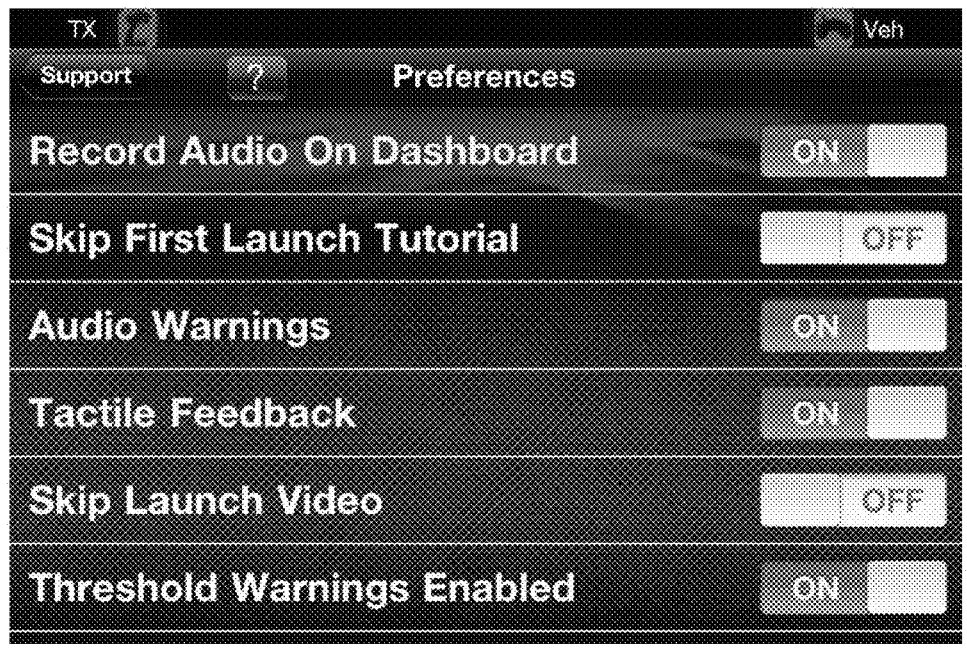
FIG. 16.P

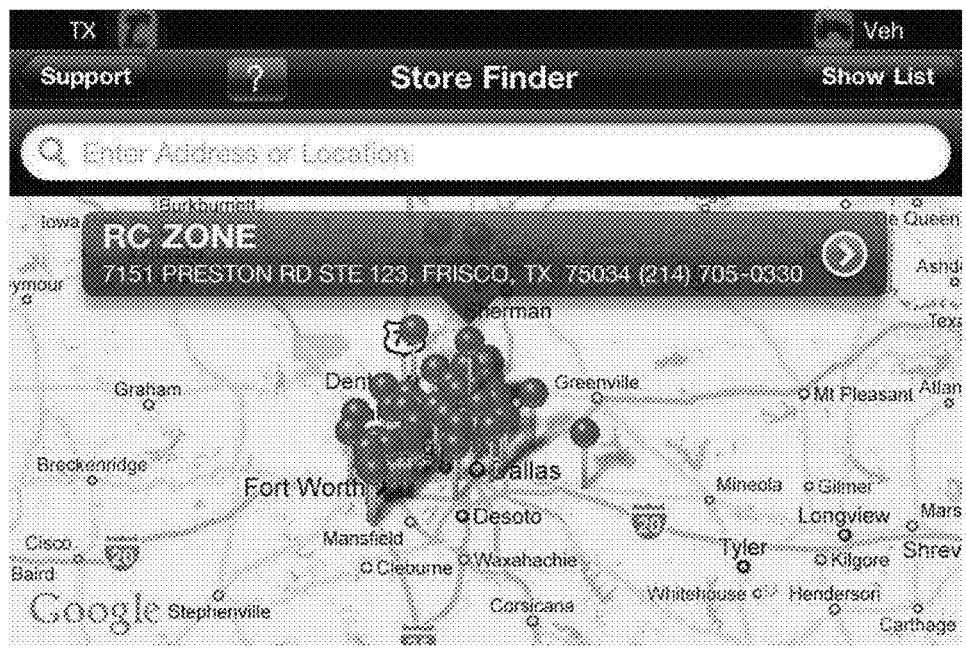
FIG. 16.Q
FIG. 16.R

FIG. 16.S
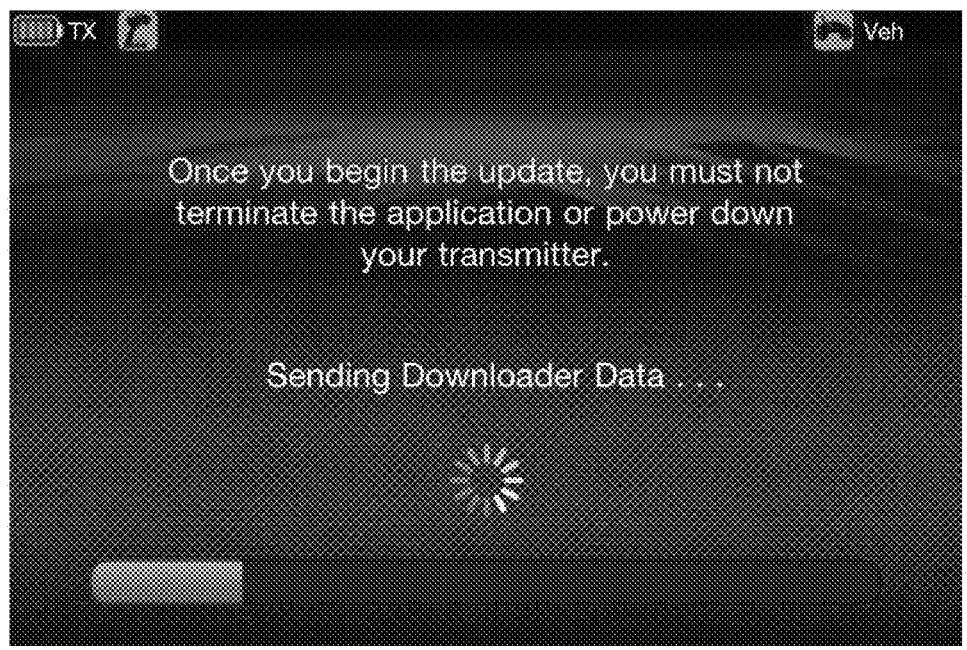
FIG. 16.T

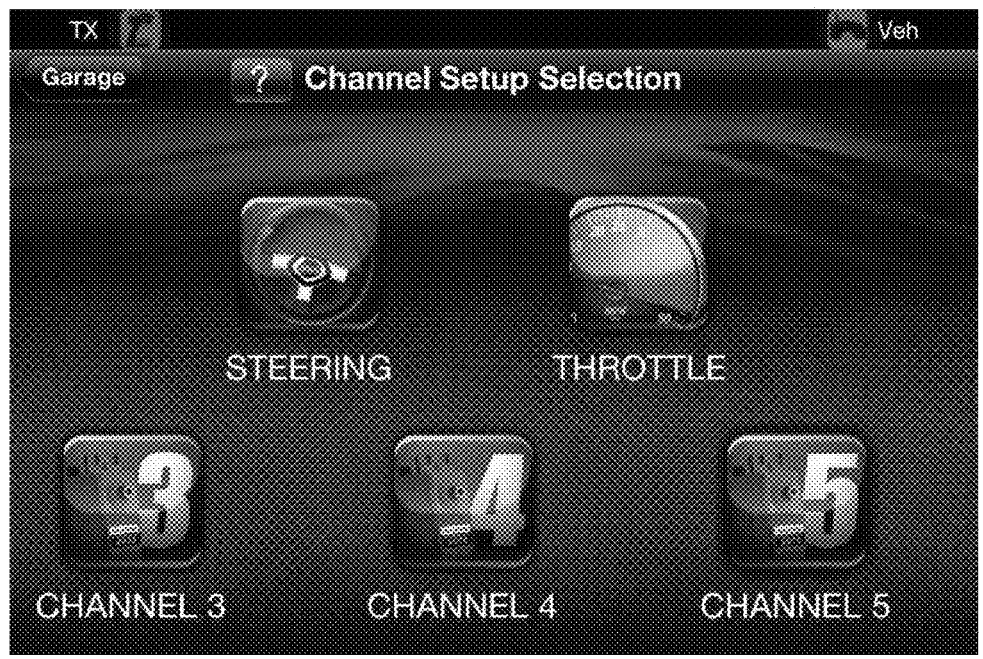
21  FIG. 16.U
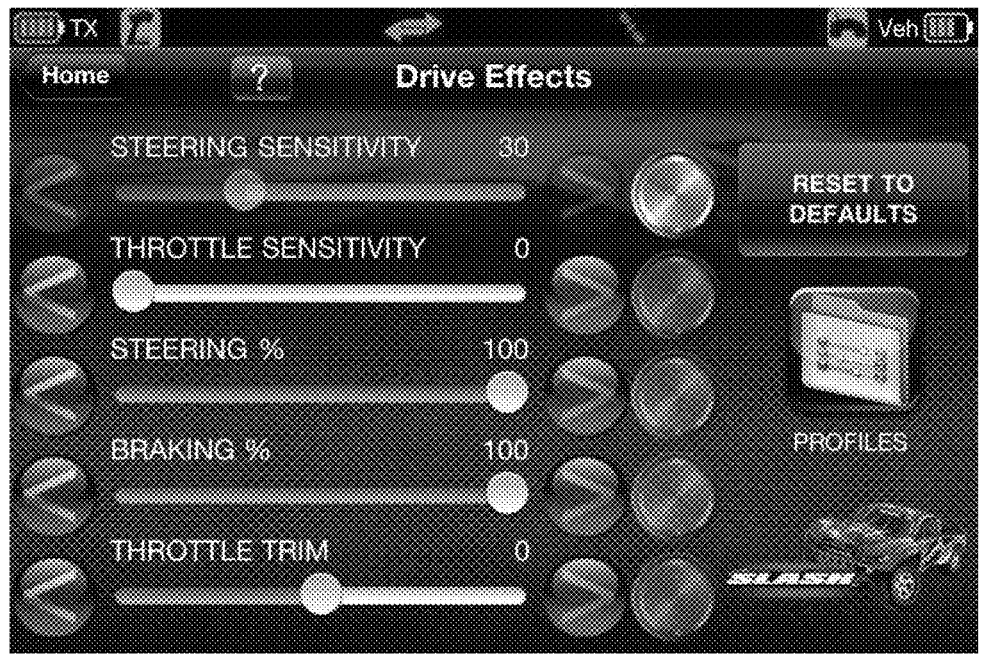
22  FIG. 16.V

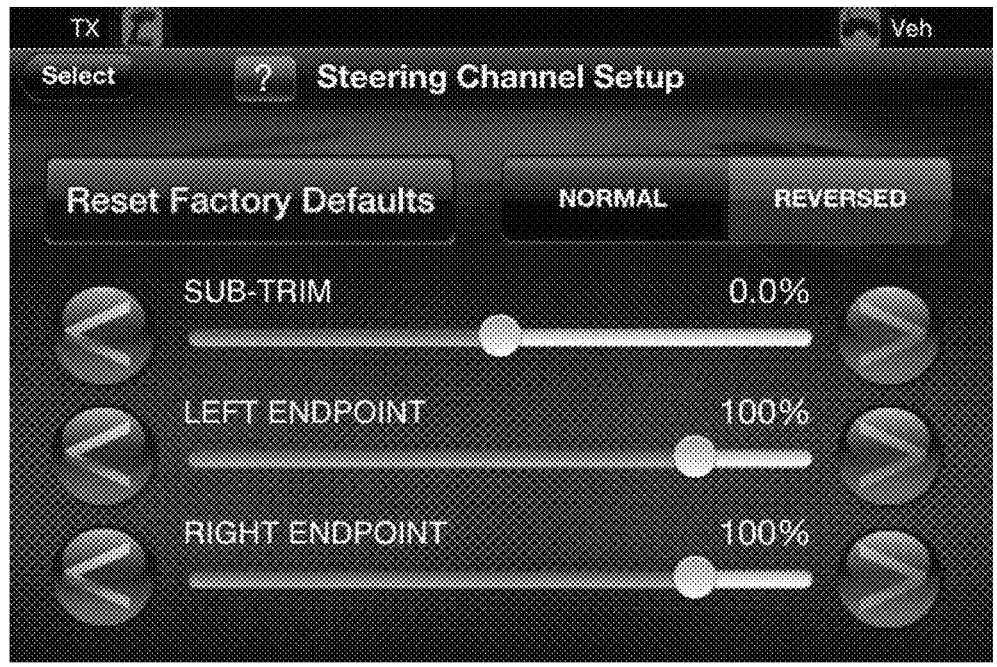
23 FIG. 16.W
24 FIG. 16.X

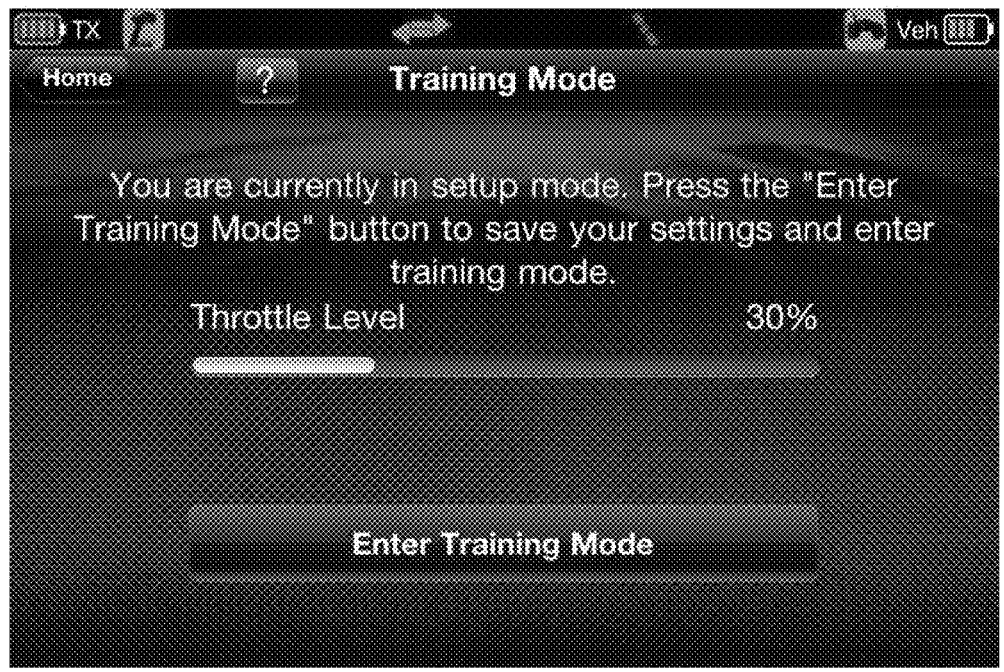
FIG. 16.Y
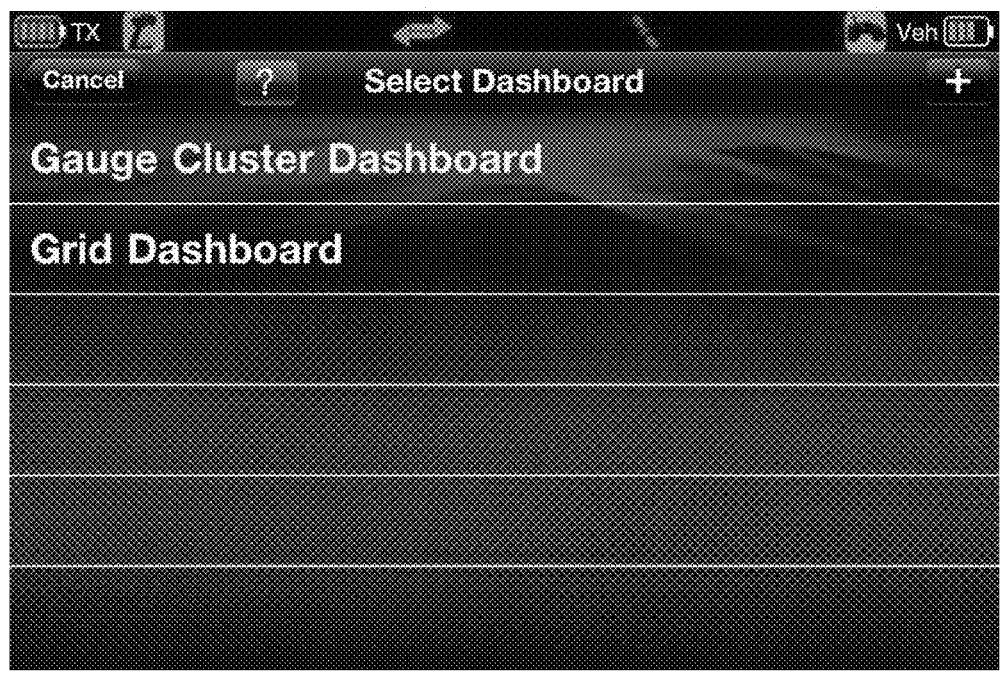
FIG. 16.Z

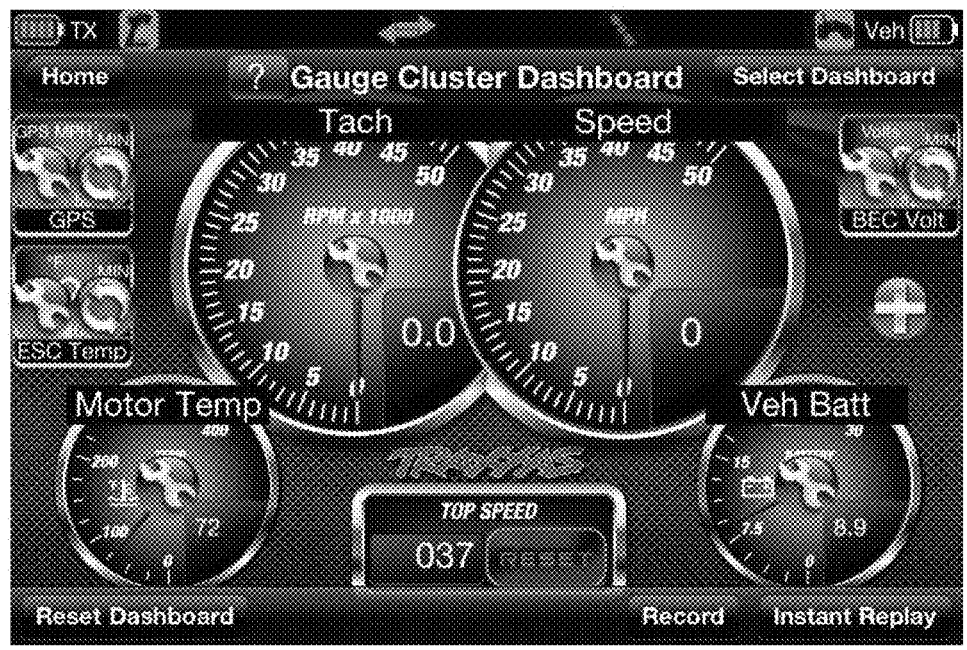
FIG. 16.AA
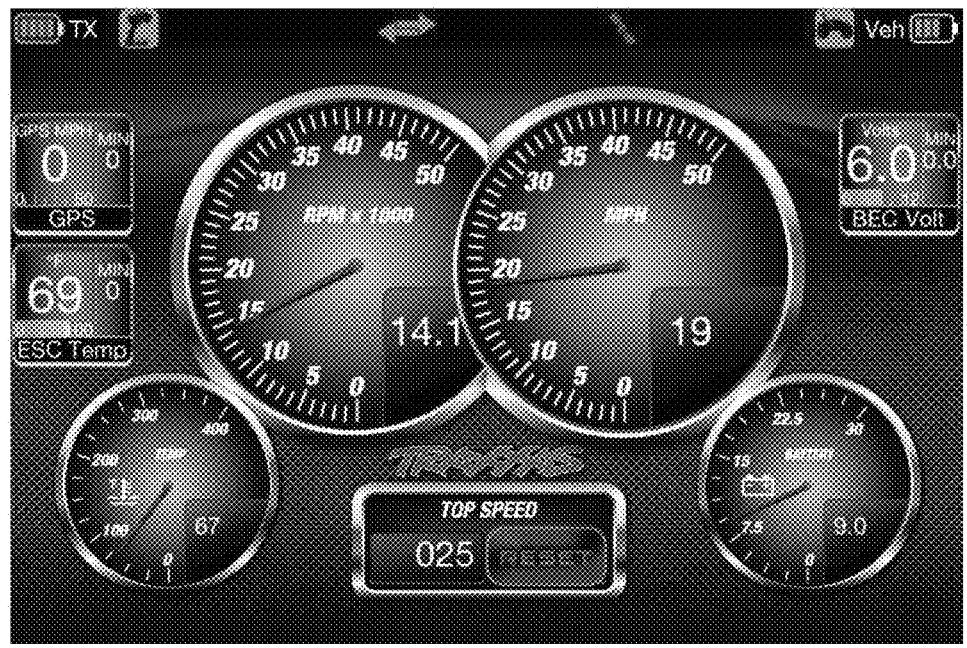
FIG. 16.AB

FIG. 16.AC
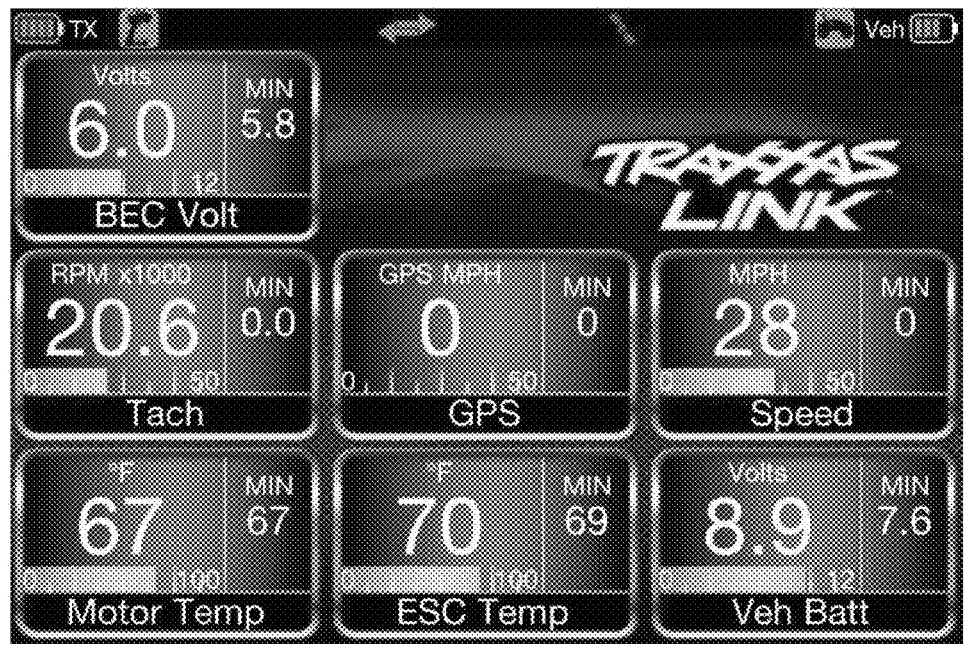
FIG. 16.AD

³¹ FIG. 16.AE
³² FIG. 16.AF

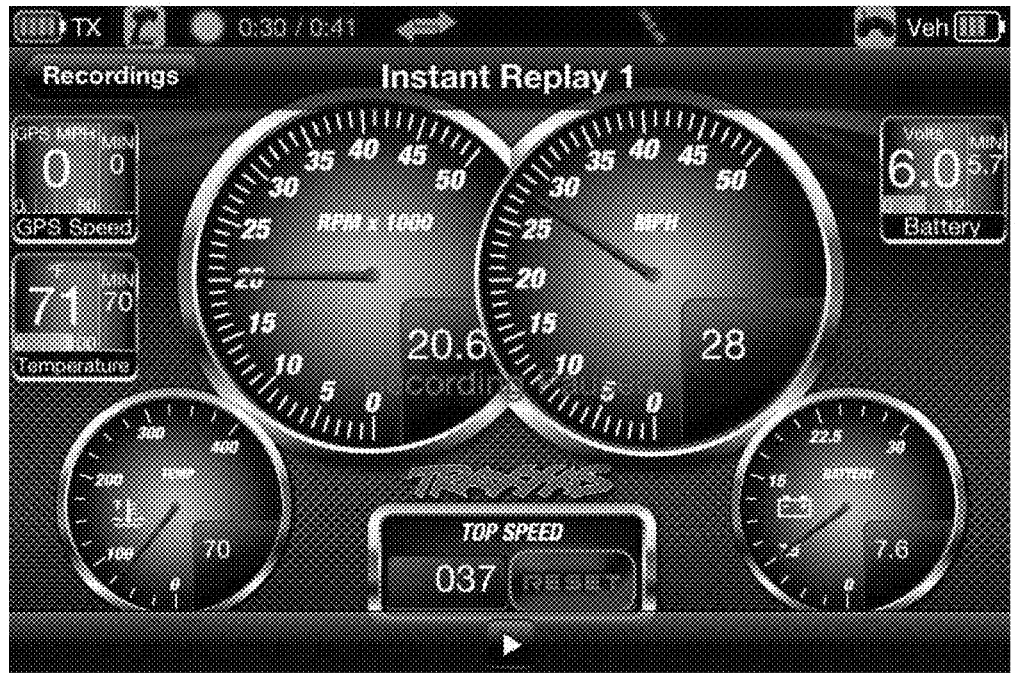
FIG. 16.AG
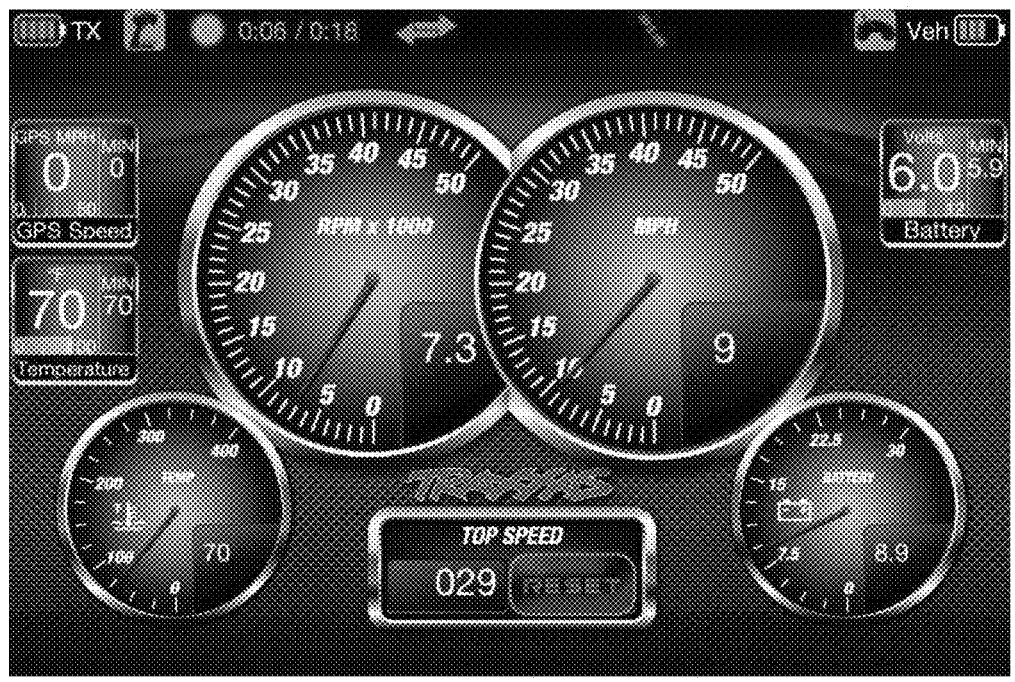
FIG. 16.AH

MULTI-FUNCTION ELECTRONIC DEVICE-ENABLED TRANSMIT CONTROLLER

CROSS REFERENCE TO RELATED APPLICATIONS

This application is a continuation of, and claims the benefit of the filing date of, co-pending international application no. PCT/US2012/062613 entitled MULTI-FUNCTION ELECTRONIC DEVICE-ENABLED TRANSMIT CONTROLLER, filed Oct. 30, 2012, which claims the benefit of U.S. provisional patent application Ser. No. 61/553,863 entitled MULTI-FUNCTION ELECTRONIC DEVICE-ENABLED TRANSMIT CONTROLLER, filed Oct. 31, 2011. The entire contents of both applications are incorporated herein by reference for all purposes.

TECHNICAL FIELD

This application relates to model vehicle transmit controllers and, more particularly, to user interfaces for model vehicle transmit controllers.

BACKGROUND

A radio control model vehicle, such as a radio control automobile, boat, or airplane, may be controlled remotely by a transmit controller. A transmit controller is often an exclusively hardware device with an exclusively hardware built-in user interface. In a transmit controller, all user input may be received through mechanical hardware components such as knobs, dials, wheels, and switches. Output to the user might be provided solely through labeled positions of the hardware components and a few LEDs.

The built-in user interface of a transmit controller may be separated into two parts: a control user interface and a parameter user interface. The control user interface directly controls the movement of the model vehicle. For example, in a typical model automobile, the control user interface includes a steering wheel and a throttle trigger. When the user turns the steering wheel, the wheels of the vehicle may move accordingly. When the user displaces the trigger toward the grip, the vehicle may accelerate, and when the user displaces the trigger away from the grip, the vehicle may brake.

The parameter user interface allows a user to set operational parameters which indirectly control the operation of the vehicle. These operational parameters may be factory-set or user-specified. Some parameters may be mandatory parameters which must be set correctly to properly control the vehicle. Other parameters may be permissive parameters which may be set as a matter of preference. An example of a mandatory parameter is servo reversing, which determines whether the left-right steering of the user should be reversed to compensate for vehicles with reversed steering servos. Examples of permissive parameters include model vehicle acceleration, steering, and braking configurations.

The operational parameters may be stored in a memory of the transmit controller. The parameters may affect how the transmit controller translates input from the control user interface into output to the model vehicle. The transmit controller can be said to "determine" an output signal to the model vehicle based on the parameters and the input to the control user interface. In other words, the parameters may determine whether or not the transmit controller modifies a control instruction from the control user interface and, if the control instruction is modified, the parameters may determine how the control instruction is modified. A collection of parameter settings may be referred to as a "profile."

In general, the functions of existing transmit controllers are inflexible. A user can do little beyond setting operational parameters using the parameter user interface and controlling the vehicle using the control user interface. In particular, it is difficult for one user to share a profile with another user. It is also difficult for a user to configure a transmit controller to communicate with telemetry sensors, and a transmit controller is typically unable to record data from telemetry sensors.

Adding additional electronic components to a conventional transmit controller may improve its functionality, but may also add significantly to the cost of the transmit controller. In addition, powering additional components may also significantly reduce the transmit controller's battery life. Thus, a need exists for a transmit controller which offers additional functionality without extensive additional components.

SUMMARY

In an embodiment, a transmit controller capable of automatic configuration is provided. The transmit controller has a memory having one or more operational parameters, a control user interface for controlling a model vehicle, an auxiliary user interface connector for connecting to an auxiliary user interface device, and a transmit controller processor. The transmit controller processor has a configuration to receive a vehicle identifier from a model vehicle receiver, transmit the vehicle identifier to the auxiliary user interface device, receive one or more operational parameter settings from the auxiliary user interface device in response, and change the one or more operational parameters to the one or more operational parameter settings. The configuration is further to receive a control instruction from the control user interface, determine an output signal based on the control instruction and the one or more operational parameters, and transmit the output signal to the model vehicle.

In another embodiment, an auxiliary user interface device for automatically configuring a transmit controller is provided. The auxiliary user interface device has a configuration to receive a vehicle identifier from a transmit controller, identify one or more operational parameter settings associated with the vehicle identifier in a vehicle database, and transmit the one or more operational parameter settings to the transmit controller.

In another embodiment, an auxiliary user interface device for transmitting operational parameter settings is provided. The auxiliary user interface device comprises a configuration to store one or more operational parameter settings, transmit the one or more operational parameter settings to a network address at a server, and send an electronic mail message comprising the network address.

In another embodiment, an auxiliary user interface device for receiving operational parameter settings is provided. The auxiliary user interface device comprising a configuration to receive an electronic mail message comprising the network address of one or more operational parameter settings, retrieve the one or more operational parameter settings from the network address, and store the one or more operational parameter settings.

In another embodiment, an auxiliary user interface device for updating an application program of a receiving device is provided. The auxiliary user interface has a configuration to receive an updated application program from a data network and transmit the updated application program to a model vehicle transmit controller.

DESCRIPTION OF DRAWINGS

For a more complete understanding of the present invention and the advantages thereof, reference is now made to the following Detailed Description taken in conjunction with the accompanying drawings, in which:

FIG. 5 depicts an exemplary method for setting a maximum power parameter;

FIG. 6 depicts an exemplary method for automatically configuring a transmit controller and an MFED to operate with a particular model and version of model vehicle;

FIG. 7A depicts an exemplary method for sending a profile or partial profile;

FIG. 7B depicts an exemplary method for receiving a profile or partial profile;

FIG. 13A-13C depict an exemplary method for configuring user interface elements shown in a dashboard for an MFED;

FIG. 14 depicts an exemplary method for setting a maximum power parameter for an MFED;

FIG. 16A-16AH depict screen captures of selected portions of the execution of an exemplary MFED application.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

A transmit controller may have the capability to communicate with a multi-function electronic device (MFED). The transmit controller may function alone, without the MFED, and provide a basic, built-in non-graphical parameter user interface. To provide an expanded parameter user interface, a MFED may be connected to the transmit controller and serve as an auxiliary user interface. The MFED may be attached to the transmit controller where the user may interact with the MFED while using the transmit controller.

MFEDs may be devices such as mobile smart phones, personal digital assistants, and digital music players. These devices are commonly available and commonly programmable. By using a MFED, the transmit controller may present a graphical user interface with only the hardware necessary to communicate with the MFED, rather than a built-in LCD display, touch screen, audio output, and so on. A user who owns a transmit controller and a MFED may save the expense of additional hardware components in the transmit controller by utilizing the hardware components available in the MFED.

Many MFEDs are capable of providing rich graphical user interfaces comparable to the graphical user interfaces of personal computers. For input, these devices may have a touch screen or keyboard. These devices may have high-resolution displays with the same range of colors as a personal computer monitor. These devices are often usable as music players and consequently may be capable of producing high-quality audio output. Some devices may have vibration capabilities.

Many MFEDs also have an external interface for communication with an external device. The external device is often a personal computer. Through the external interface, the MFED may communicate with the personal computer and vice versa. A MFED may function as an auxiliary user interface for a transmit controller. In an exemplary embodiment, a MFED communicates with a model vehicle transmit controller using the external interface, allowing the MFED to function as an auxiliary user interface for a transmit controller.

Figure 1:
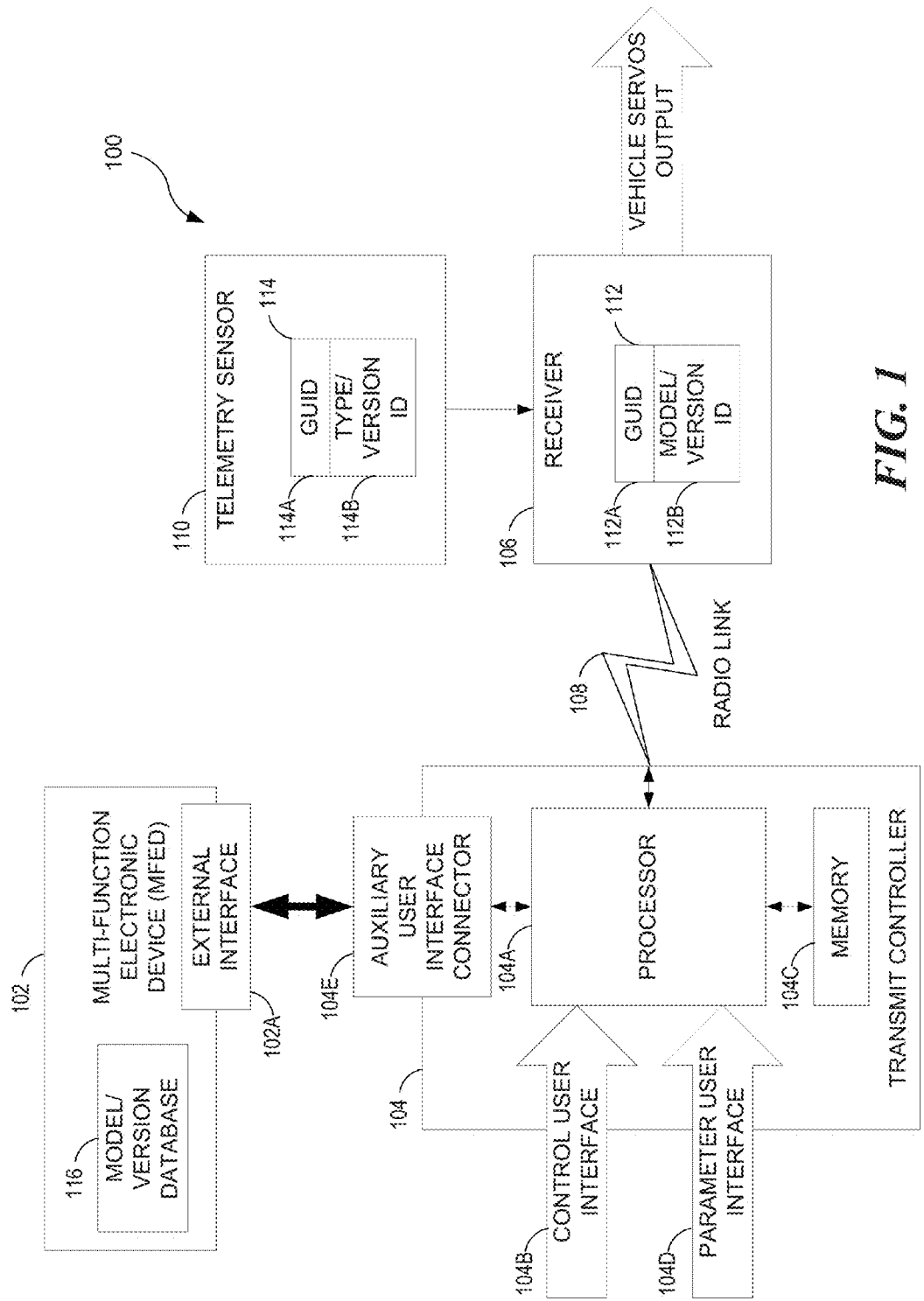
FIG. 1 depicts a combination of an MFED, transmit controller, receiver, and telemetry sensor in accordance with an exemplary embodiment of the present invention.

With reference to FIG. 1, depicted is a combination 100 of a MFED 102, transmit controller 104, and receiver 106 in accordance with an exemplary embodiment. The transmit controller 104 and receiver 106 may be in radio communication through radio link 108 as is known in the art. Despite their names, both transmit controller 104 and receiver 106 may be capable of both transmitting and receiving radio communications. Thus, transmit controller 104 and receiver 106 may each be called a "transceiver," but to distinguish between the two devices the terms "transmit controller" and "receiver" will be used herein.

The MFED 102 may be a smart phone or digital music player. Exemplary MFEDs are the iPhone and iPod Touch produced by Apple Inc. Both of these exemplary MFEDs may accept user input via a touch screen. MFED 102 may be connected to transmit controller 104 through external interface 102A of MFED 102. External interface 102A may be a conventional hardware interface of MFED 102, such as the connection used by MFED 102 to communicate with a personal computer.

Transmit controller 104 may have a dock for storing MFED 102, so that the user may more easily concurrently operate both devices. A typical MFED 102 may be physically smaller in volume, or at least not substantially larger in volume, than a typical transmit controller 104. The reason is that a user may be expected to operate MFED 102 while simultaneously controlling a vehicle with transmit controller 104. If transmit controller 104 is designed to be held with both hands, a substantially larger MFED 102 may be difficult for the user to work with.

MFED 102 may execute a software application for communication with transmit controller 104. The software application may be provided to MFED 102 through an Internet download. Internet download is a common software application delivery method for many MFEDs.

Transmit controller 104 may have processor 104A. Processor 104A may determine what output signal is transmitted to receiver 106 over radio link 108. The output signal may be determined from user input from control user interface 104B and one or more parameters stored in memory 104C. Control user interface 104B may be components of transmit controller 104 which permit a user to directly control the operations of a model vehicle. These components may include a steering wheel and throttle trigger. Once processor 104A determines the output signal that should be transmitted, it may send the signal through a radio frequency module.

Transmit controller 104 may connect to external interface 102A of MFED 102 through auxiliary user interface connector 104E. The connection between external interface 102A and auxiliary user interface connector 104E may be wired or wireless, and a wired connection may be through direct contact or through a cable between the two devices. In some embodiments, auxiliary user interface connector 104E may include a cable, with one end of the cable permanently attached to transmit controller 104.

A wireless connection between external interface 102A and auxiliary user interface connector 104E may be a Bluetooth connection. The wireless connection between external interface 102A and auxiliary user interface connector 104E may also be a wireless local area network connection using a standard such as IEEE 802.11, also known as Wi-Fi. External interface 102A and auxiliary user interface connector 104E may include Bluetooth or 802.11 transceivers. MFED 102 may be a mobile smart phone, and many mobile smart phones include Bluetooth and 802.11 transceivers. Auxiliary user interface 104E may utilize a Bluetooth or 802.11 transceiver built into transmit controller 104 or an external dongle with a Bluetooth or 802.11 transceiver.

One advantage of using a wireless connection between external interface 102A and auxiliary user interface connector 104E is that a single transmit controller 104 may easily support different types of MFEDs 102. Different MFED manufacturers may use different physical connections for their MFEDs. Accordingly, transmit controller 104 may be require a separate external interface 102A for each type of MFED. In contrast, a wireless standard such as Bluetooth or 802.11 may typically be supported by a variety of devices.

Another advantage of using a wireless connection between external interface 102A and auxiliary user interface connector 104E is that the wireless connection permits MFED 102 to be separated from transmit controller 104. A user's pit man, for example, could use MFED 102 while the user continues to operate the vehicle with transmit controller 104. Further, if a wireless local area network connection such as IEEE 802.11 is used, multiple MFEDs 102 may be in communication with a single transmit controller 104 at the same time. Therefore, a user and the user's pit man may each have a functioning MFED 102 while the user is controlling the vehicle with transmit controller 104.

When MFED 102 is not connected, the user may modify the parameters in memory 104C through parameter user interface 104D. Parameter interface 104D may allow the user to modify basic parameters such as servo reversing, steering sensitivity, and throttle sensitivity. These basic parameters may be sufficient for the user to operate the model vehicle, but may be limited by the input and output capabilities of parameter interface 104D.

When the user connects MFED 102 to auxiliary user interface connector 104E, MFED 102 may provide the user with a graphical user interface permitting the user to gain access to additional parameters and additional feedback. MFED 102 may also offer a graphical display of parameter values as they are set through parameter interface 104D.

Figure 2:
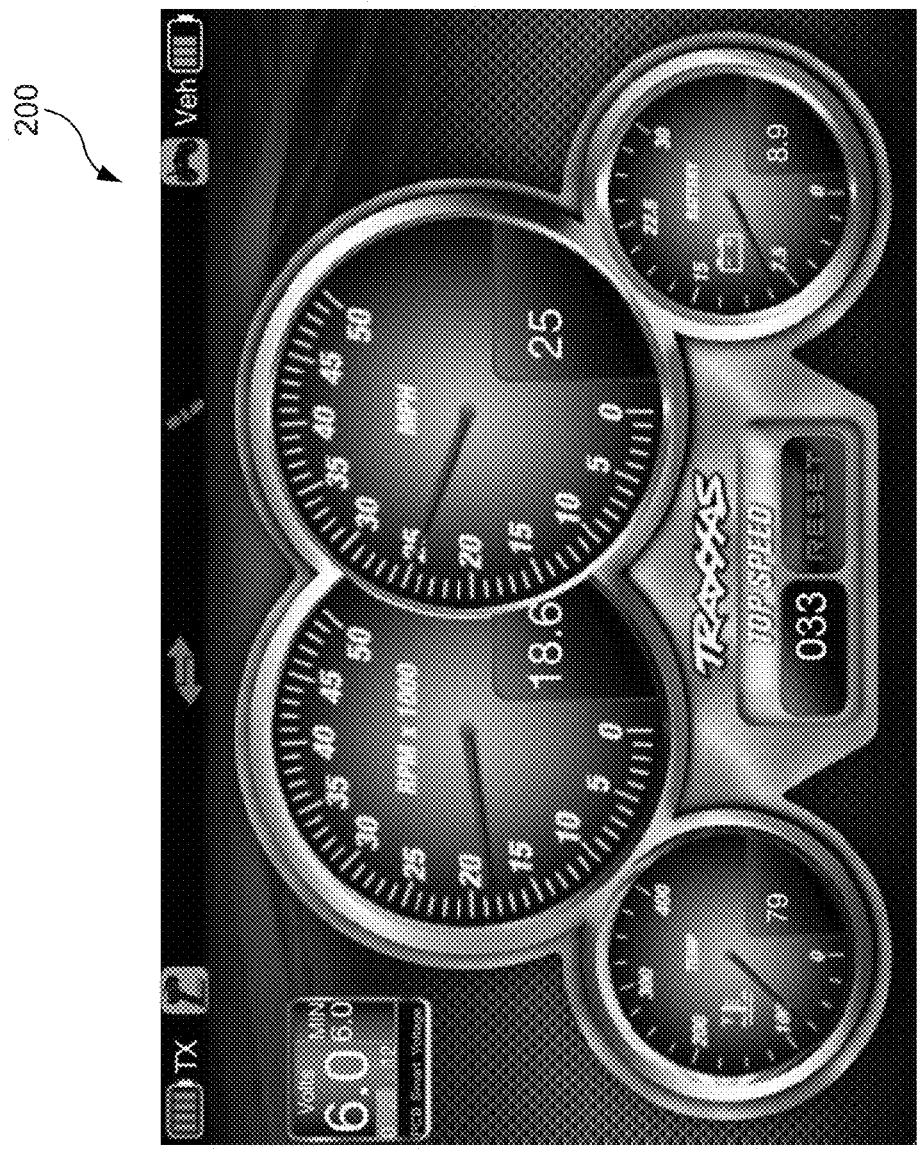
FIG. 2 depicts an exemplary dashboard user interface elements offered by an MFED.

Referring to FIG. 2, depicted is an exemplary "dashboard" 200 of user interface elements that an MFED may offer a user. The dashboard graphically displays a variety of data for the user obtained from telemetry sensors installed in the model vehicle, including engine temperature, motor RPM, vehicle speed, and battery voltage. Dashboard 200 also displays the vehicle's top speed for this session, which the MFED tracks from the vehicle speed telemetry data. The user may configure the user interface elements shown in a dashboard and their arrangement to the user's preference, as shown and described more fully in FIG. 13A-13C.

Referring to FIG. 1, the configuration of the dashboard may be stored in a profile as a set of parameters which are used only when MFED 102 is connected. The graphical user interface may also provide the user with access to the same parameters and feedback available through transmit controller 104 alone. Parameter user interface 104D may become inoperable when MFED 102 is connected.

To display a parameter, auxiliary user interface device 102 may request the parameter from processor 104A. In response to the request, parameter 104A may transmit the parameter from memory 104C to MFED 102.

When the user chooses to modify a parameter using MFED 102, MFED 102 transmits a parameter instruction to transmit controller 104. The parameter instruction instructs processor 104A to modify the parameter in memory 104C according to the user's input.

MFED 102 may transmit signals to and receive signals from the vehicle through transmit controller 104. Through the graphical user interface provided by MFED 102, the user may set the various parameters stored in memory 104C. The user may set be able to set the parameters in memory 104C while operating a model vehicle, while not operating a model vehicle, or both.

MFED 102 may store a list of profiles for the user to select from. The graphical user interface of MFED 102 offers a convenient way to view and edit these profiles. When the user selects a profile, MFED 102 may instruct transmit controller 104 to store parameters for that profile in memory 104C. MFED 102 may also configure itself according to the selected profile, such as displaying a dashboard specified by parameters in the selected profile.

An exemplary parameter which may be set using the MFED 102 is a reduced maximum power parameter. The maximum power parameter may be expressed as a percentage of "absolute maximum" power[1] the receiver can cause to be supplied to the motor of the model vehicle. Transmit controller 104 may interpret all acceleration specified by control user interface 104B as relative to the maximum power parameter. The maximum power parameter allows a user to reduce the amount of power which can be supplied to the motor, which in turn allows an inexperienced user to more easily maintain control of the model vehicle. The maximum power parameter may be set in real time while the vehicle is stationary or while the vehicle is in motion, including while the user moves the throttle trigger.

[1] Power is commonly supplied to the motor of a model vehicle as a square wave, with the duty cycle of the square wave controlling the acceleration of the vehicle. Technically, in such cases the acceleration of the model vehicle varies with the average amount of power supplied to the motor. For simplicity this discussion will consistently refer to the "amount" of power supplied, with the "amount" of power understood to mean the average amount of power in such cases.

For example, suppose acceleration of the model vehicle is controlled by a throttle trigger on control user interface 104B, and the maximum power parameter is set to 20%. The user may move the throttle trigger to a maximum throttle position, an input which instructs transmit controller 104 to supply 100% of the maximum power parameter to the motor. Transmit controller 104 would cause receiver 106 to apply 100% of the 20% maximum power parameter to the motor, which is 20% of the absolute maximum power. If the input was a half throttle position instructing transmit controller 104 to supply 50% of the maximum power parameter to the motor, transmit controller 104 would instruct receiver 106 to 10% of absolute maximum power to the motor. If the input was a quarter throttle position instructing transmit controller 104 to supply 25% of the maximum power parameter to the motor, transmit controller 104 would instruct receiver 106 to supply 5% of the absolute maximum power to the motor, and so on.

Figure 3:
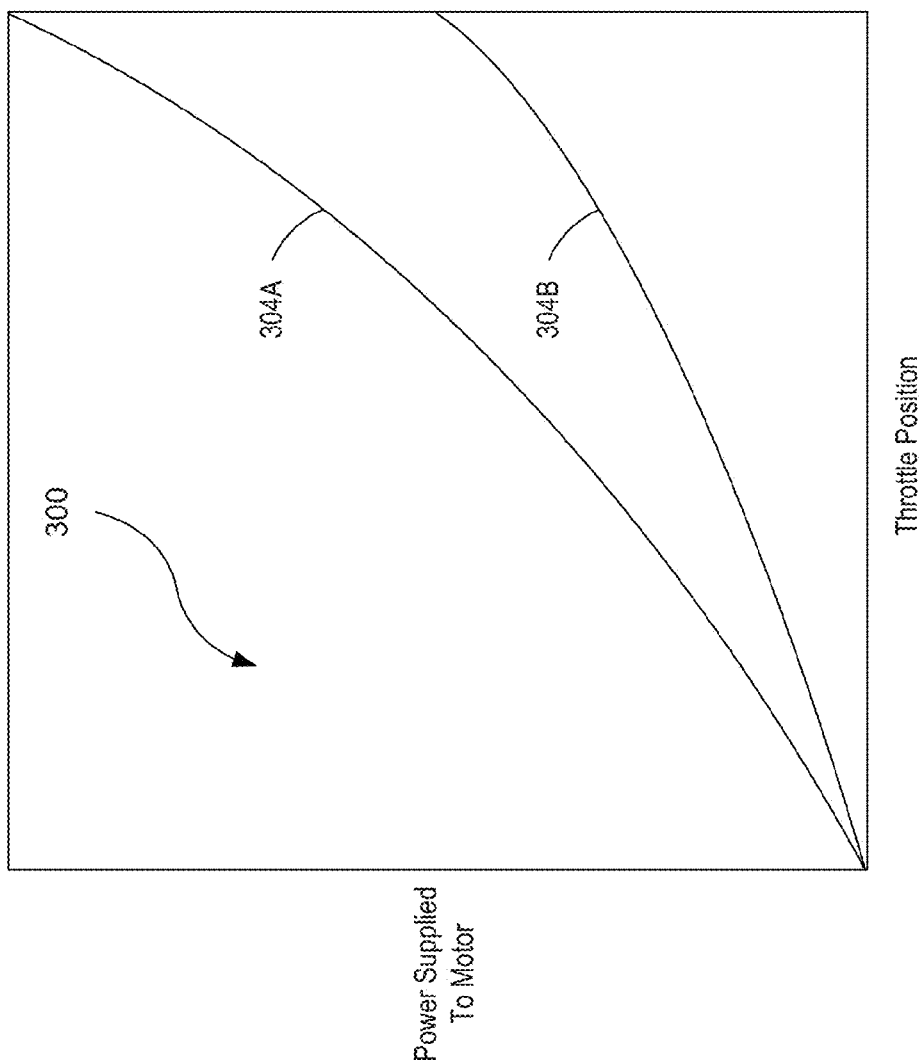
FIG. 3 depicts a graph showing the effect of two exemplary maximum power parameter settings.

Referring to FIG. 3, depicted is a graph 300 showing the effect of two exemplary maximum power parameter settings. Curves 304A and 304B show the power supplied to the motor at throttle positions between a neutral throttle position and a maximum throttle position. For curve 304A, the maximum power parameter is set to 100%. Curve 304A gradually increases from no power supplied to the motor at the neutral throttle position to the absolute maximum power supplied to the motor at the maximum throttle position. For curve 304B, the maximum power parameter is set to 50%. For each throttle position, the power supplied to the motor in curve 304B is 50% of the power supplied to the motor in curve 304A. At the maximum throttle position, 50% of the absolute maximum power is supplied to the motor in curve 304B.

Figure 4:
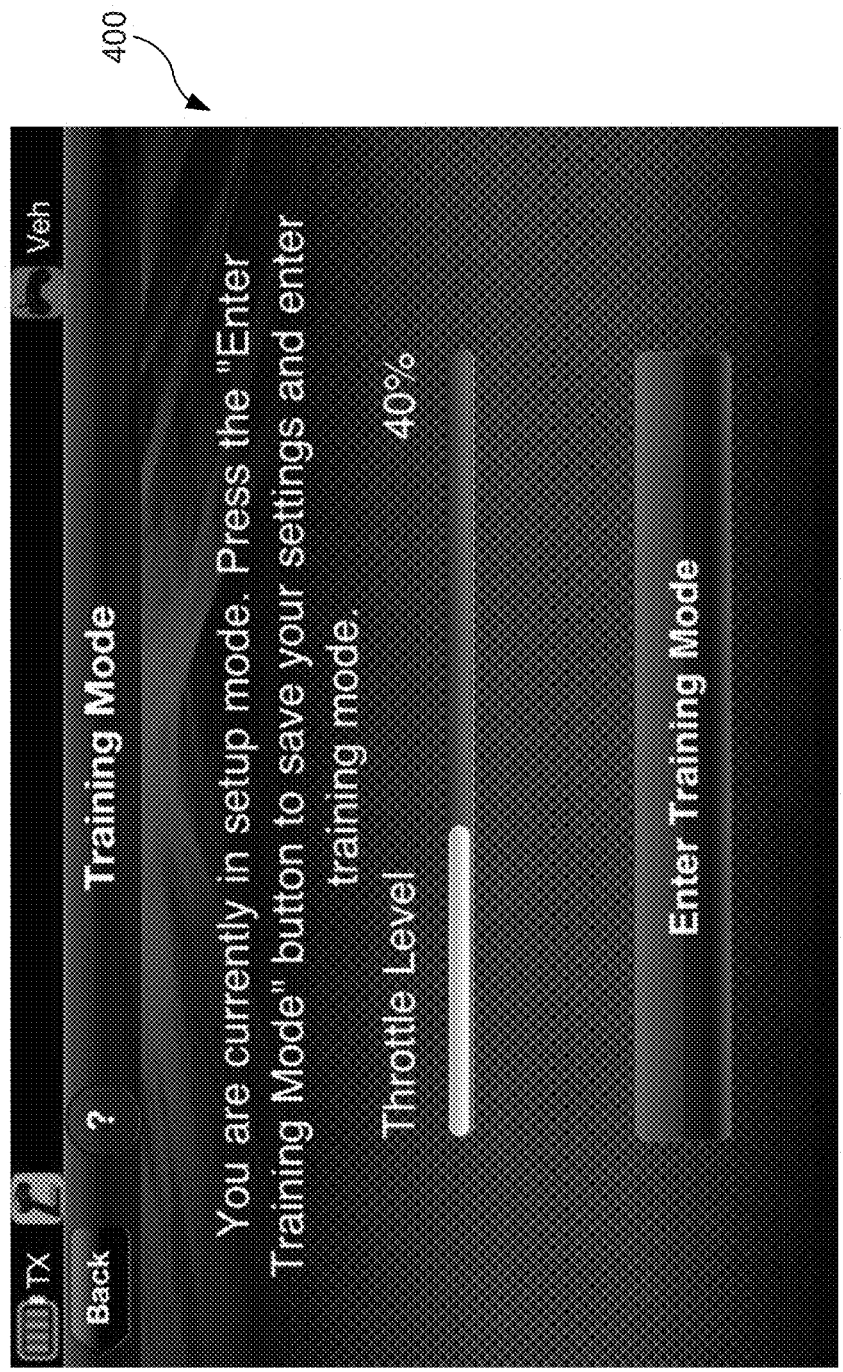
FIG. 4 depicts an exemplary maximum power parameter slider that may be displayed by a touch screen of an MFED.

MFED 102 provides a convenient graphical interface for adjusting the maximum power parameter. Referring to FIG. 4, depicted is an exemplary maximum power parameter display 400 that may be displayed by a touch screen of the MFED. In FIG. 4, the maximum power parameter is described as the "throttle level." Display 400 shows the current maximum power parameter both graphically and numerically. Display 400 permits a user to easily see the maximum power parameter over a wide range of possible values, such as any whole percentage between 5% and 100%.

Display 400 works in conjunction with a knob on the transmit controller. The user adjusts the maximum power parameter using the knob, and the maximum power parameter is shown in display 400. The use of display 400 in setting the maximum power parameter is shown and described more fully in FIG. 14. In an alternate embodiment, a user could use a touch screen of the MFED to both adjust and see the maximum power parameter.

Referring to FIG. 5, depicted is an exemplary method 500 for setting the maximum power parameter. At 502, the MFED provides the user with a graphical interface, such as the slider depicted in FIG. 5, for setting the maximum power parameter. At 504, the MFED receives the user's setting through the slider. At 506, the MFED transmits the setting to the processor of the transmit controller. At 508, the processor of the transmit controller stores the maximum power parameter in the memory of the transmit controller. The transmit controller processor can then retrieve the maximum power parameter from the memory when interpreting input from the control user interface. As discussed above, the acceleration of the model vehicle specified by the control user interface may be relative to the maximum power parameter.

Referring to FIG. 1, receiver 106 may have a receiver ID 112 on an electronic security chip. Receiver ID 112 may identify receiver 106 to MFED 102. First, receiver ID 112 may have a globally unique ID (GUID) 112A, which uniquely identifies the particular receiver 106 from other receivers. Second, receiver ID 112 may have a model/version ID 112B which identifies the vehicle receiver 106 is installed in.

Model/version ID 112B may identify the model vehicle in one of two ways. First, model/version ID 112B may identify the model and version of the model vehicle because model/version ID 112 is unique to that model and version of model vehicle. Second, model/version ID 112 may identify the model vehicle as a model vehicle which has had receiver 106 installed after the vehicle was manufactured. This could be because receiver 106 replaced a previous receiver for the model vehicle.

MFED 102 may store a model/version database 116 having configuration data for a variety of vehicle models and versions. Exemplary configuration data in model/version database 116 may include:

How the user interface of MFED 102 should be configured for the model and version;
Vehicle specific graphics for the user interface of MFED 102;
Vehicle characteristics necessary to calculate the vehicle speed, such as gear ratio and tire diameter;
The type of battery or batteries in the model and version, and the associated battery voltages for full, empty, etc.;
Safe operating temperatures for components of the vehicle, including the engines, motors, and batteries;
The thermistor correlation curve for the thermistor of the vehicle, used in compensation necessary for accurate (within 3-4° Fahrenheit) measurement at high temperatures;
The operating and control characteristics of smart modules and sensors connected to the vehicle;
Factory settings for permissive operational parameters, such as steering expo, brake percentage, etc.; and
Factory settings for mandatory operational parameters, such as end points and servo reversing.

Referring to FIG. 6, depicted is an exemplary method 600 for automatically configuring a transmit controller and an MFED to operate with a particular model and version of model vehicle. At 602, when a radio link is established between a transmit controller having an MFED and a receiver having a model/version ID, the receiver may provide the model/version ID to the MFED through the radio link and the transmit controller. At 604, the MFED may identify the model vehicle model and version corresponding to the model/version ID. If the model/version ID is for a receiver installed after the manufacture of a model vehicle, the MFED may prompt the user to select the model and version.

In either case, the MFED may find configuration data for the identified model and version in the model/version database. The MFED may configure itself to function as specified by the configuration data. For example, the MFED may present a dashboard of telemetry data specific to the particular model and version of the model vehicle. The MFED may also configure parameters stored in the transmit controller memory. At 606, the MFED may provide parameter settings from the configuration data to the transmit controller processor. At 608, the transmit controller processor may store those parameter settings in the transmit controller memory.

In addition to automatic configuration using the model/version database, an MFED may offer a model history feature. The model history feature may provide a "warehousing" of information related to each model vehicle that has been controlled by a transmit controller connected to the MFED. Essentially, the model history feature may separately record the entire model setup configuration for each model vehicle. When the transmit controller reconnects to one of these model vehicles, the MFED may recognize the vehicle by the GUID of its receiver and offer the option of using the model setup configuration recorded by the model history feature. For a user who owns multiple vehicles with customized configuration data, the model history feature may save significant time re-setting the configuration of each vehicle when it is connected.

Receivers installed after the manufacture of a model vehicle may be moved between vehicles. As described previously, for this type of receiver the user may be prompted to select the model and version of a connected vehicle. In this case, the model history feature may recognize the vehicle by both the GUID of the receiver and the selected model and version.

Because MFEDs commonly have network connectivity capabilities, the model/version database may be remotely updated. Subsequent models and versions may be added to the model/version database, new features for existing models may be added, and the configurations for existing models and versions may be revised. The updates for the model/version database may be downloaded by the MFED through an Internet connection.

The network connectivity capabilities of an MFED may also be used to permit transmit controllers to share profiles with one another. Alternately, a user may share a "partial profile," which is a selection of less than all of the parameter settings in a profile. Referring to FIG. 7A, depicted is an exemplary method for sending a profile or partial profile. A sending user may select a profile or partial profile to share from a list of profiles stored in the MFED, or from the memory of the transmit controller. At 702, the MFED may receive the sending user's selection. At 704, the MFED may send the profile or partial profile to a server. At 706, the MFED may then create an electronic mail message containing a hyperlink to the profile or partial profile. The electronic mail message may be created in a conventional electronic mail application of the MFED. The sending user may edit the message and select a recipient. At 708, the MFED may send the message to the receiving user. In addition to sending the message via an Internet connection, the MFED may send the message via an ad hoc network, including a Bluetooth, Wi-Fi, or cable ad hoc network.

Referring to FIG. 7B, depicted is an exemplary method for receiving a profile or partial profile. At 710, the receiving user's MFED may receive the electronic mail message sent by the sender. At 712, when the receiving user selects the hyperlink to the profile or partial profile, the receiving user's MFED may recognize the hyperlink as a hyperlink to a profile or partial profile based on the hyperlink URL. At 714, the receiving user's MFED may then launch an application for operating a model vehicle. At 716, the application may retrieve the profile from the server and add the profile to the receiving user's list of profiles. The application may subsequently configure the MFED and the receiving user's transmit controller to use the retrieved profile.

Referring to FIG. 1, telemetry sensor 110 may communicate with receiver 106. Telemetry sensor 110 may be connected to a telemetry connector in the model vehicle, connected to a telemetry connector in receiver 106, or connected to an expander connected to a telemetry connector. Multiple telemetry sensors may communicate with a single receiver.

Telemetry sensor 110 may capture telemetry data and provide it to receiver 106. Receiver 106 may transmit the telemetry data to transmit controller 104 over radio link 108. The telemetry data may include data such as motor temperature, motor RPM, speed, battery voltage, and fuel level. Transmit controller 104 may provide the telemetry data to MFED 102, if it is attached. In an alternative embodiment, telemetry sensor 110 and MFED 102 may communicate directly, without passing communications through transmit controller 104.

Telemetry data may be provided to the user through built-in components of transmit controller 104, but the inclusion of MFED 102 can greatly improve the presentation of the telemetry data to the user. For example, in addition to using its graphical display, MFED 102 may provide feedback to the user through its audio and vibration capabilities.

An exemplary parameter which takes advantage of the output capabilities of the auxiliary user interface is an accelerometer sensor in the model vehicle. The accelerometer sensor can be used to detect bumps, collisions, jumps, and landings of the model vehicle. The accelerometer sensor can provide the acceleration data to the MFED 102 through receiver 106, radio link 108, and transmit controller 104. MFED 102 may vibrate during periods of sudden changes in acceleration of the model vehicle, providing additional feedback to the user. Because the feedback is tactile, the user may receive the feedback even when the user is not looking at transmit controller 104 or MFED 102.

Telemetry sensor 110 may have a sensor ID 114 on an electronic security chip. Similar to receiver ID 112, sensor ID 114 may include a globally unique ID (GUID) 114A, which uniquely identifies the particular telemetry sensor 110 from other telemetry sensors. Sensor ID 114 may also have a type/version ID 114B which identifies the type of data sensed by telemetry sensor 110 and the version of telemetry sensor 110.

Figure 8:
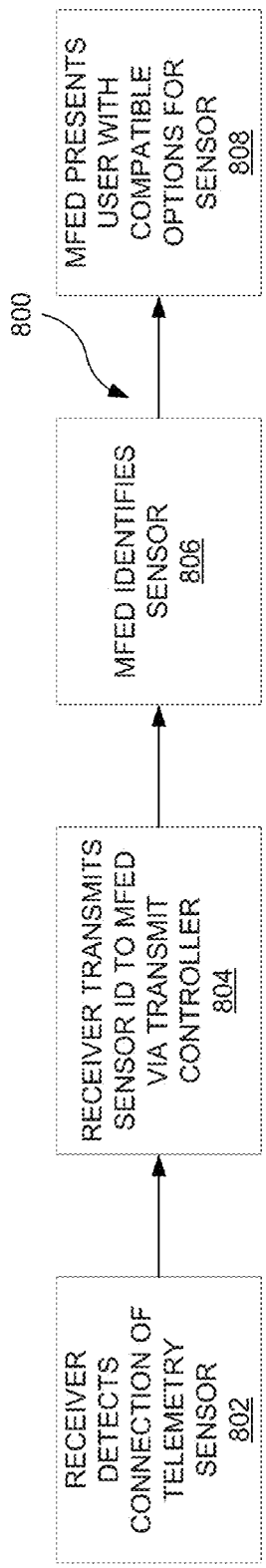
FIG. 8 depicts an exemplary method for automatic configuration of a telemetry sensor.

Referring to FIG. 8, depicted is an exemplary method 800 for automatic configuration of a telemetry sensor. At 802, a receiver may detect a telemetry sensor has been connected. At 804, the receiver may read the sensor ID and transmit the sensor ID to an MFED via a transmit controller. The sensor ID allows the telemetry sensor to correctly transmit data when connected to an arbitrary connector on the receiver, the model vehicle, or an expander. Because any port may be used, a user installing the telemetry sensor does not have to identify a compatible port for installing the telemetry sensor.

At 806, the MFED may determine the type and version of the telemetry sensor from the type/version ID. From the type and version of the sensor, the MFED may determine which data channel data from the sensor should be directed to. At 808, the MFED may present the user with a list of options for displaying data from the telemetry sensor. For example, for a speed sensor the MFED may present the user with the choice of an analog or a digital speedometer for a dashboard. The user may select a custom name for the sensor.

Figure 15:
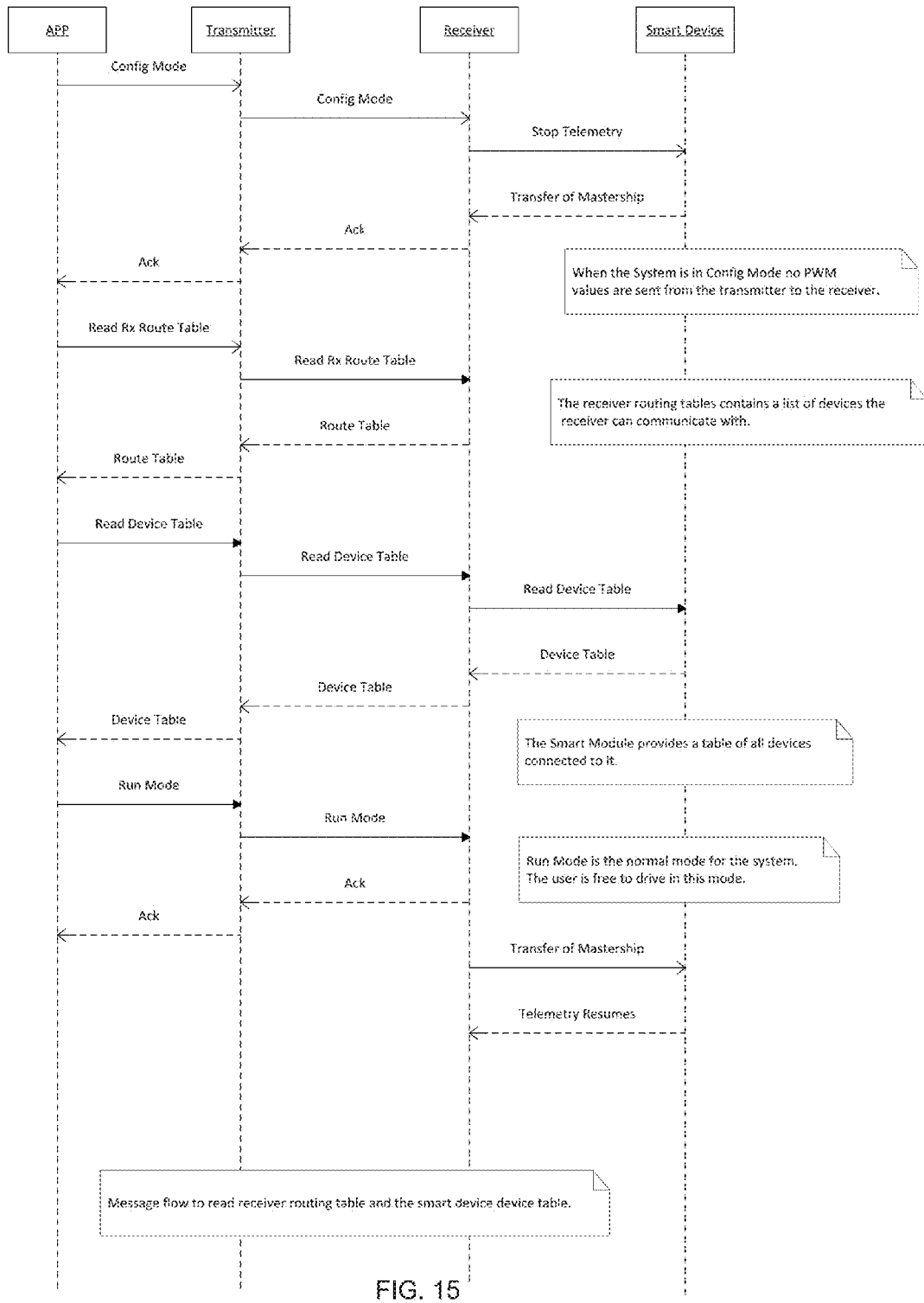
FIG. 15 depicts an exemplary diagram of messages sent between an MFED, a transmit controller, a receiver, and a telemetry sensor or expander.

FIG. 15 shows a diagram of messages sent between the MFED (labeled "APP"), transmit controller (labeled "Transmitter"), receiver (labeled "Receiver"), and telemetry sensor or expander (labeled "Smart Device"). In addition to telemetry sensors, the MFED may communicate with an expander to receive telemetry data from the telemetry sensors connected to the expander.

Figure 9:
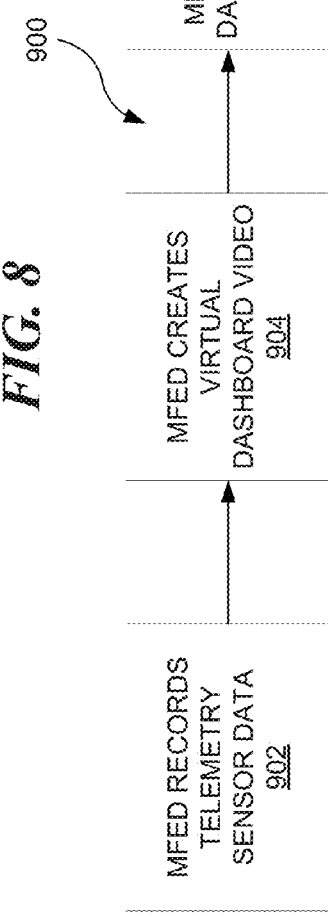
FIG. 9 depicts an exemplary method for creating a video of a virtual dashboard.

In addition to displaying telemetry data in a real-time dashboard, an MFED may record telemetry sensor data and create a video of a "virtual" dashboard. Referring to FIG. 9, depicted is an exemplary method for creating a video of a virtual dashboard. At 902, an MFED may record telemetry sensor data for a user-specified period. At 904, the user may then select a dashboard configuration to display the data. The MFED may create a video of the virtual dashboard displaying the recorded data as the data would have been shown in the virtual dashboard if that dashboard configuration were in use when the data was recorded. At 906, the video may be published to a public website for public viewing.

Figure 10:
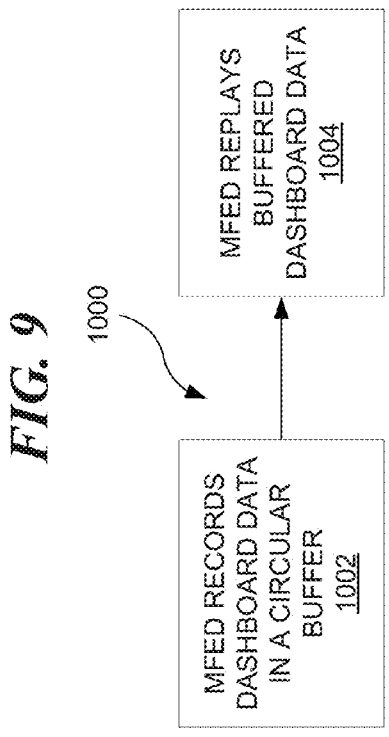
FIG. 10 depicts an exemplary method for providing an instant replay feature.

When the MFED is not recording telemetry data, the user may experience an extraordinary event the user would like to review. Referring to FIG. 10, depicted is an exemplary method 1000 for providing an "instant replay" feature. At 1002, the MFED may automatically record a certain amount of past telemetry data when the MFED is not already set to record telemetry data. The recorded telemetry data may be stored in a circular buffer. For example, the MFED may automatically record the last 60 seconds of telemetry data. The MFED dashboard may have an "instant replay" button for the user to press upon experiencing an extraordinary event. At 1004, when the user presses the instant replay button, the MFED may save and replay the contents of the circular buffer.

Referring to FIG. 1, MFED 102 may download updated software for devices MFED 102 communicates with, including transmit controller 104, receiver 106, telemetry sensor 110 and any other telemetry sensors, and any expander connecting telemetry sensor 110 to receiver 106. MFED 102 may receive new software and check what the existing software versions are for the available devices which can receive updated software ("receiving devices"). MFED 102 may communicate with a receiving device through transmit controller 104, except when transmit controller 104 is itself the receiving the device.

Each receiving device may have a memory which may store three programs: a boot loader program, an application program, and a downloader program. The boot loader program may determine which of the other two programs to run. The application program may cause the device to perform its functions other than downloading updated programs. A program may not replace itself, so a downloader program is used to download a new application program. Likewise, an application program is used to download a new downloader program. The boot loader program may not be updated.

Figure 11:
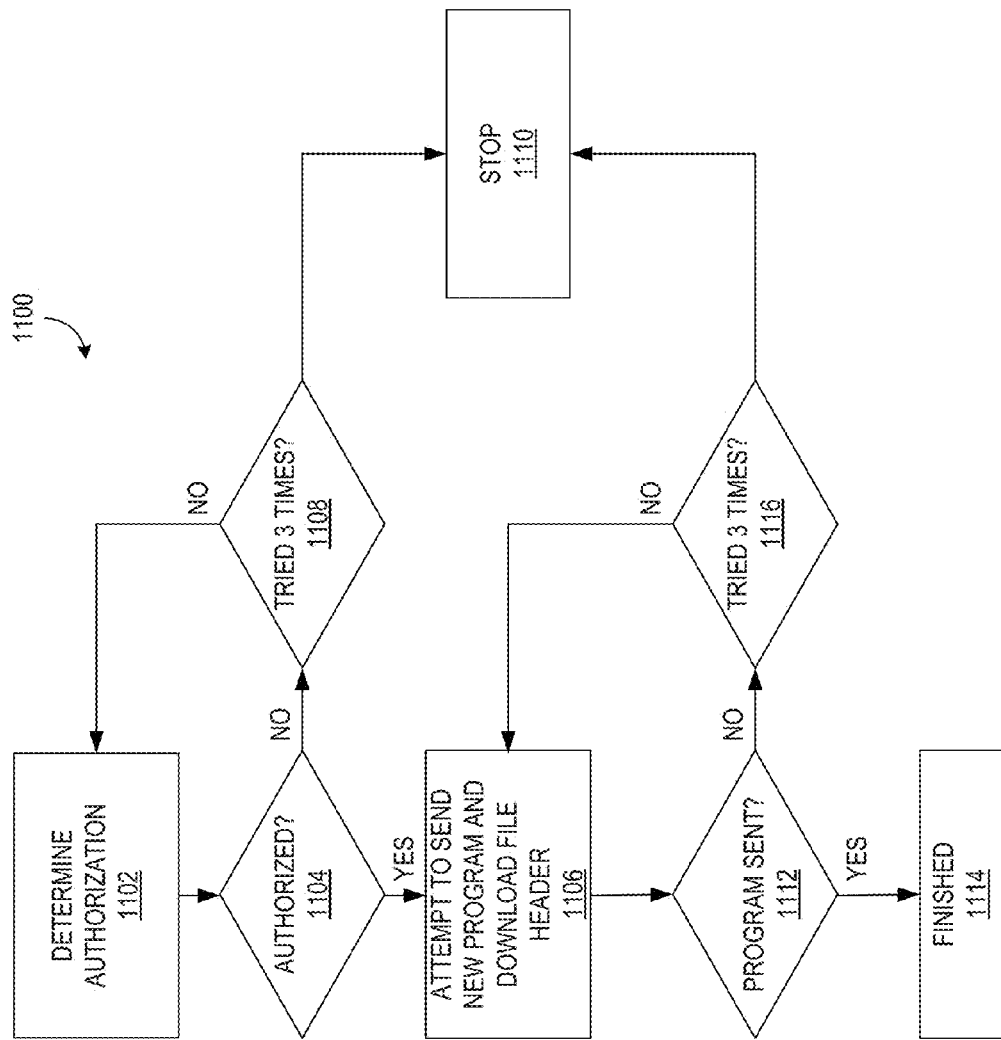
FIG. 11 depicts an exemplary method an MFED may perform to try and retry the sending of software to a receiving device.

Referring to FIG. 11, depicted is a process 1100 which an MFED may use to try and retry sending a downloader program or application program to a receiving device. At step 1102, the MFED may make an authorization check to determine if the new program is authorized. Step 1102 may prevent the receiving device from executing programs which were not created by the manufacturer of the receiving device. Each program may be encoded with a combination of a random number and a key stored on the device which is to execute the program. A download file header included with the program may include the random number and a separate encoding challenge. To perform the authorization check, the MFED may send the encoding challenge to the receiving device.

If the receiving device is able to decode the encoding challenge, the program is considered authorized and the download may proceed to step 1106. If the receiving device cannot decode the encoding challenge, at step 1108 the MFED may send the encoding challenge up to three times before stopping at step 1110.

At step 1106 the MFED attempts to send the new program and the download file header. At step 1112, the MFED determines if the receiving device has successfully downloaded the new program. If so, the program update is finished at step 1114. If the download is unsuccessful, at step 1116 the MFED may attempt to send the program up to three times before stopping at step 1110.

To update an application program on a receiving device, process 1100 may typically be performed twice. First, the MFED may send the downloader program, because the application program on the receiving device cannot replace itself. Second, after the downloader program is sent, the MFED may send the application program, and the downloader program on the receiving device may replace the existing application program with the updated application program.

Figure 12:
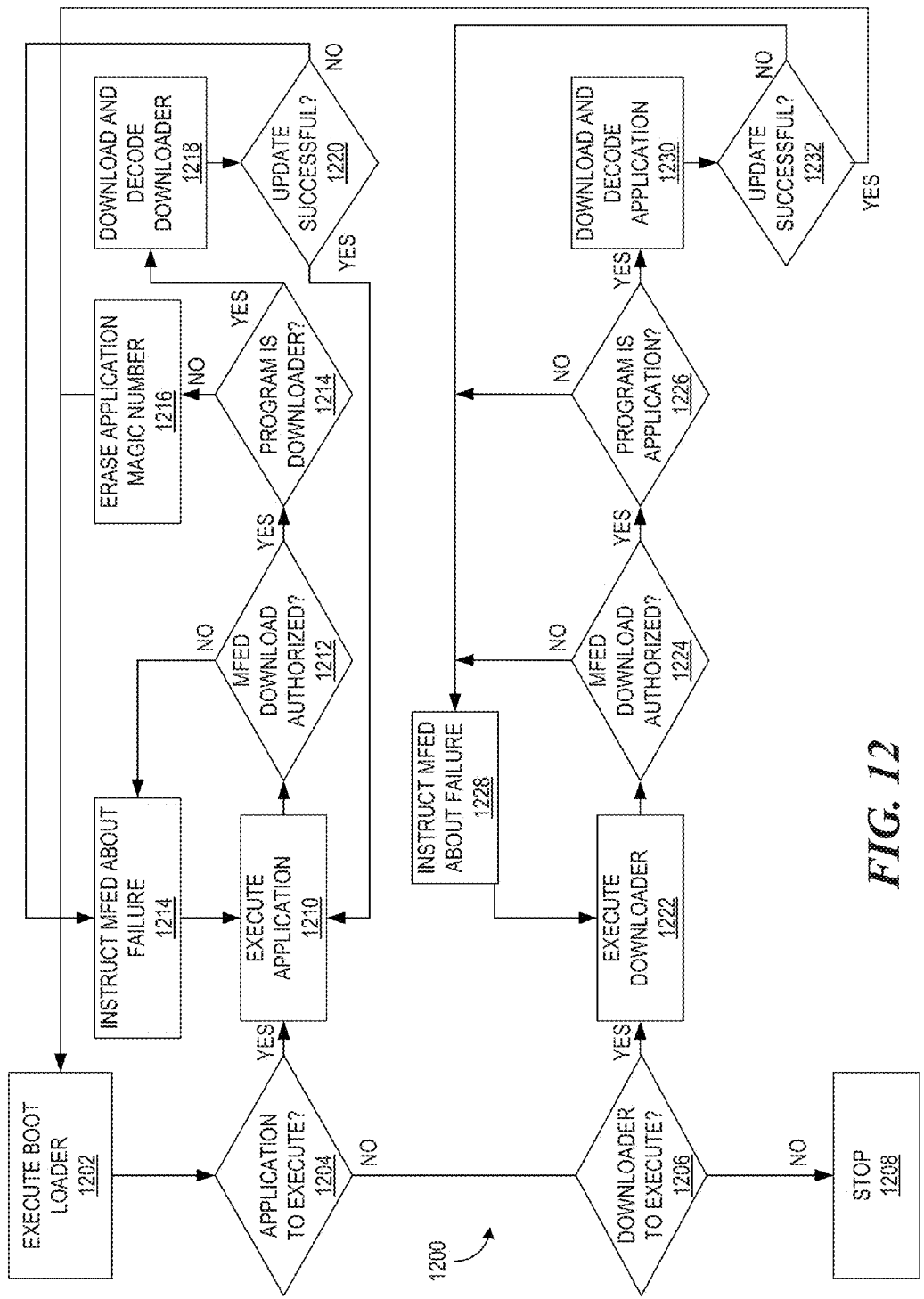
FIG. 12 depicts an exemplary method a receiving device may perform to download software from an MFED.

Referring to FIG. 12, depicted is an exemplary method 1200 which a receiving device may perform to download software from an MFED. The receiving device may begin at step 1202 by executing the boot loader program. At step 1204, the boot loader may determine if the receiving device contains an application program to execute. The boot loader may perform this step by checking for an application "magic number" which signifies the existence of an application program. If no application program is available, the boot loader may determine at step 1206 if the receiving device contains a downloader program to execute. The boot loader may likewise perform this step by checking for a downloader "magic number" which signifies the existence of a downloader program. If the receiving device contains neither an application program nor a downloader, method 1200 may stop at step 1208.

If an application program is located at step 1204, the boot loader may execute the application program at step 1210. The application program may cause the receiving device to perform its normal functions. For example, a transmit controller may process user input for controlling the model vehicle. A telemetry sensor may capture and transmit telemetry data.

The receiving device may continue to execute the application program to perform its normal functions until it receives a message from an MFED instructing it to download a program. Then, at step 1212, the receiving device may perform the authorization check, working in conjunction with the MFED. The receiving device may attempt to decode the security challenge and inform the MFED whether it was able to do so. If the receiving device is unable to decode the security challenge, it informs the MFED at step 1214.

If the receiving device is able to download the security challenge, the receiving device determines whether the program the MFED is attempting to send is a downloader program. If the program is not a downloader program, it is an application program, and an application program cannot download another application program. Therefore, at step 1216, the application program erases the application magic number and the process returns to step 1202. Because the application magic number was erased, the boot loader will not execute the application at step 1204.

If the program is a downloader program, at step 1218 the receiving device downloads the downloader program and the associated download file header. The receiving device may decode the downloader program using the random number stored in the file header and the key stored on the receiving device. At step 1220, if the update was successful the application program may return to executing the application at step 1210. The MFED may then typically attempt to send the updated application program, causing the application magic number to be erased at step 1216 and the recently downloaded downloader program to be executed at step 1222. If the update was not successful the receiving device may instruct the MFED about the failure at step 1214.

At step 1222, the boot loader may execute the downloader program. The downloader program may download an application program similarly to how an application program downloads a downloader program. However, the downloader program may simply wait for an MFED to send an application program at step 1222, rather than performing the normal functions of the receiving device. At step 1224, the downloader program may determine if the download from the MFED is authorized, and at step 1226 the downloader program may determine if the MFED is attempting to send an application program. Similar to an application program, a downloader program may be unable to replace itself with a second downloader program. If the download is not authorized or MFED is attempting to send a downloader program, at step 1228 the downloader program may notify the MFED of the failure and return to executing the downloader program at step 1222.

At step 1230 the downloader program may download the application program and the associated download file header. The downloader program may decode the application program using the random number in the download file header and the key stored on the receiving device. At step 1232, the downloader program may determine if the update was successful. If the update was not successful, the downloader program may instruct the MFED about the failure at step 1228 and return to executing the downloader at step 1222. If the update was successful, the downloader program may execute the boot loader at step 1202. Because an application program was downloaded, the boot loader may execute the application at step 1210.

User documentation for an exemplary MFED application is reproduced below.

Model Memory

Each time the Traxxas Traxxas-Link is bound to a new receiver, that receiver and its settings is stored in the Model Memory. Traxxas' latest models include identification data in the receiver, enabling your Traxxas Link to automatically recognize which model the receiver is installed in. Traxxas Link will automatically store settings for up to 30 models in Model Memory. When you switch a model on, Traxxas Link will automatically recognize the receiver and return to the settings last used with that receiver/model.

Telemetry Configuration

The Telemetry Configuration screen shows the sensors that are installed on your model. Touch Sync Now with your model switched on and linked to the transmitter, and any Installed sensors will appear in the Slot Position column. Tap a sensor to change its name; for example, you may wish to name the Temperature sensor "Motor Temp" or "Speed Control Temp."

Channel Setup

Traxxas Link's Channel Setup menu allows you to select the each of the 5 available channels and set the Sub-Trim, Left Endpoint and Right Endpoint for each channel. You can also "reverse" the channel (for example, if moving the transmitter's steering wheel left causes the vehicle to steer to the right, the steering servo must be reversed to restore proper control function.) Simply touch the button for the channel you wish to set up, then move the sliders or tap the +/− icons to alter the settings. After you select a channel to adjust, tap the "?" icon to learn more about the settings.

Channel 3/4/5 Setup

The Channel Setup screen allows quick and easy adjustments to the servo's Sub-Trim and Endpoints; touch the headings below to expand and learn more.

Sub-Trim

The Sub-Trim function is used to precisely set the neutral point of the servo.

Left Endpoint/Right Endpoint

The limit of the servo's travel range (or its "end point") can be set independently for left and right travel. This allows you to fine-tune the servo settings to prevent binding caused by the servo moving a linkage or component farther than its mechanical limit.

Normal/Reversed

Switch from Normal to Reversed (or vice versa) if the servo moves in the opposite direction of your intended command.

Reset Factory Defaults

Tap to return the Sub-trim and Endpoint settings to the original factory settings for the selected model.

Dashboard

The Dashboard is where you can view all the vital functions of your vehicle as you drive—just like the dashboard of a full-size car. But unlike that dashboard, the [Traxxas BART] dashboard can be configured to suit your preferences for data, display style, warning thresholds, and more.

Available Gauges:

Temperature

[Traxxas BART]'s telemetry system monitors motor or engine temperature. With the Dashboard, you can set a maximum temperature value, and [Traxxas BART] will alert you when the temperature exceeds the limit. The Model Data Base the is loaded into the [Traxxas BART] application provides factory recommended warning level settings that are automatically set for the specific model vehicle you are connected to. The User has the ability to override these warning levels to his preference.

Mph

[Traxxas BART] does more than just show you your vehicle's speed; it saves your maximum speed, and can be set with a warning threshold.exceed the speed limit, and [Traxxas BART]'s alarm will let you know you're going too fast! Using the advanced grid gauge, you can set the gauge to remember the max, min, or average value of speed.

Rpm

Revolutions Per Minute—how fast is your motor or engine spinning? This vital information allows you to monitor performance, see the effect of gearing changes, and make sure you're achieving peak power. You can even set your own redline, and [Traxxas BART] will alert you if you rev too high.

Screen Shots and Recording

Save a still image of the Dashboard, or record the dashboard display of your run in real time and play it back. [Traxxas BART] allows you to name and save recordings. Even if you aren't recording, you can replay the last minute of dashboard data by selecting .Capture.

Customizing the Dashboard

Tap the dashboard to display Wrench icons (to edit gauges), Reset icons (to reset gauges) and + icons (to add gauges to the dashboard). You will also see .Select Dashboard., .Reset Dashboard., .Record., and .Instant Replay. buttons.

Tap .Select Dashboard. choose the Gauge Cluster Dashboard or Grid Dashboard designs.

To edit a gauge, touch the Wrench icon over the gauge; to add a gauge to the dashboard, touch the + symbol where you wish the gauge to appear.

To reset a gauge's saved minimum or maximum values, touch the reset icon.

Drive Effects

The Drive Effects controls allow you to customize "feel" of your model's steering, throttle, and brake. The items below can be adjusted easily by moving a slider or tapping the "<" and ">" controls. You can also assign any of the Drive Effects controls to the Multi-Function Knob for easy adjustment on the fly.

Steering Sensitivity

The Steering Sensitivity control (also known as Steering Exponential, or Expo) adjusts the responsiveness of the model's steering servo. When set for "zero," the steering servo's travel (and with it, the steering motion of the model's front wheels) corresponds precisely with the steering wheel. As the Sensitivity value is increased, the steering becomes less responsive near neutral, with increasing sensitivity as the servo nears the limits of its travel range. The farther you turn the knob, the more pronounced the change in steering servo movement will be.

Throttle Sensitivity

Throttle Sensitivity (Throttle Exponential) works the same way as Steering Sensitivity, but effects the responsiveness of the throttle servo or electronic speed control. Only forward throttle is affected; brake/reverse travel remains linear regardless of the Throttle Sensitivity setting.

Steering %

Steering %, also known as Dual Rate, controls the amount (percentage) of servo travel applied to steering. Setting the value to 100% will provide full steering throw; by reducing the value, steering throw will be reduced. Steering % is used to adjust steering throw to match the needs of your track or driving conditions; to set the maximum left and right travel limits of the steering servo, use the End Point settings in the Garage.

Braking %

Braking %/Dual Rate functions controls the amount of brake travel applied by the servo in a nitro-powered model. Electric models do not have a servo-operated brake, but the Braking Percentage function still operates the same way in electric models. Setting Braking % to 100% delivers maximum braking capability; reducing the value reduces braking force (note: setting Braking % to zero will eliminate all braking action).

Throttle Trim

Throttle Trim allows you to adjust the throttle's neutral position to prevent unwanted brake drag or throttle application when the transmitter trigger is at neutral.

Multi Function Knob

Tap the image of the Multi Function Knob to access the menu of controls that may be assigned to the knob. Once assigned, you can easily control the function by turning the transmitter's Multi Function Knob.

Edit Gauge

The Edit Gauge screen allows you to modify, name, and remove gauges. Touch the links below for more information.

Remove Gauge

Tap .Remove Gauge. to delete a gauge face from the dashboard. The gauge will appear as a .blank. until a new gauge face is assigned.

Set Warning Level

Warning Levels allow you to program BART to sound an alarm when the gauge exceeds a certain value (for example, you could set an alarm if a certain rpm is exceeded). If the gauge's readout exceeds the warning level, BART will sound an alarm and/or vibrate depending on the preference you have set.

Change Display Name

Tapping Change Display Name will open a dialog box where you may input a new name for the gauge.

Updates

The latest updates for the Traxxas Link software are located here. Touch an update to a view its description. To load the updates, touch Update Firmware. Once you begin the update, do not switch off the transmitter or your mobile device.

Garage

The Garage is where you can modify the settings for your model, including Training Mode settings, gear ratio, tire type, battery type, and more. The Traxxas Link app is pre-loaded with the factory settings for all Traxxas models. These settings can be changed, then saved as new profiles that you name. If you wish to return to the factory settings, they can be reloaded at any time. You can access the following screens from the Garage. Touch the headings for more information:

Model Select

Traxxas Link automatically recognizes the model you have switched on. If you have moved your receiver to another vehicle, or have purchased a new receiver that is not already associated with a vehicle, you can use the Model Select screen to assign a new model to the receiver.

Model Setup

In order to provide accurate telemetry data for your model, the Traxxas Link application needs to know the model's gear ratio, tire size, battery type, and other parameters listed in the Model setup screen. All the correct parameters for stock Traxxas vehicles are pre-loaded into the application. If you change the gear ratio, tires, battery type or any of the other parameters, the Model Setup screen is used to input the new settings.

Telemetry Configuration

The Telemetry Configuration screen lists the sensors installed on your model. The "Sync Now" button will sync the sensors with the Traxxas Link application.

Training Mode

Training Mode allows you to quickly and easily limit the model's top speed so young, inexperienced, or less-skilled drivers can operate your model more safely and easily.

Model History

A complete list of all the models the TQi transmitter has been bound to can be accessed by touching the Model History icon.

Add Gauge—Choose Gauge Face

Slide left to view the gauge designs and tap the design you wish to use. Note that some designs offer a greater range of values; choose the range that best suits your vehicle. For example, if your vehicle will exceed 30 mph, choose the 0-100 mph gauge face instead of the 0-30 mph gauge face.

Save Profiles

Tap a Profile to view its settings. To load the Profile, tap Load Profile.

Multi Function

Tap the Drive Effect you wish to assign to the Multi-Function Knob. Once selected, it will appear .ghosted. on the Drive Effects screen and may only be adjusted by operating the Multi-Function Knob on the transmitter.

Store Finder

The Store Finder makes it easy to find your local Traxxas Dealer. Traxxas Link may prompt you to allow it to use your location; tap "yes," and the stores near you will automatically be placed on a map. Or, you may enter your address manually by selecting Manual Address and filling in the required information.

Preferences

The Preferences screen lets you customize the BART application to your liking. The following can be switched on and off:

Record Audio on Dashboard

In addition to recording vehicle data, the Dashboard's recording feature can record your voice so you can make verbal notes during your run.

Skip First Launch Tutorial

Slide the toggle to OFF if you do not wish [Traxxas BART] to play the introductory video.

Audio Warnings

Switching Audio off will make BART operate silently. Note that any audio alarms you have programmed will not sound when audio is turned off.

Tactile Feedback

Selecting this option will cause the iPhone to simulate the feel of physical buttons by sending a pulse of vibration with each button .press. Note: tactile feedback is not supported by iPod Touch.

Skip Launch Video

Slide the toggle to OFF if you do not wish [Traxxas BART] to play the introductory video.

Threshold Warnings Enabled

Switching this function to OFF will disable the warning alarms you set using the Dashboard controls. Your threshold warning setting will not be changed.

Override Status Bar

Enabling this option will hide the iPod/iPhone's status bar, which displays internet connectivity status, time, and the iPod/iPhone's battery status. When the status bar is hidden, the [Traxxas BART] application will use the space to display the transmitter/iPod/iPhone connection status, telemetry signal status, and transmitter battery level.

Display Timeout

The iPhone/iPod has a timeout feature that automatically dims the screen if no activity is detected. Select .Off. to override the iPhone/iPod's screen timeout feature. Select .Not on dashboard. to allow the timeout function to operate normally on all screens except the Dashboard.

Theme

[Traxxas BART] allows you to choose .Light. and .Dark. themes for easiest viewing. Choose the Light theme for low-light conditions; choose the Dark theme for use in sunlight or other bright conditions.

Security Code

Model Setup

BART relies on specific information about your model to generate accurate telemetry data. If you are operating a stock Traxxas model and have selected that model from the Garage, there is no need to make any changes to Model Setup. However, if you have made changes to your model's gear ratio, tires, or battery, you will need to input new data in Model Setup or your telemetry results will not be accurate. Be sure to input the correct values for the following:

Spur Gear

This is the large, external gear on the transmission. The number indicates the number of teeth on the gear.

Pinion Gear

This is the smaller gear that meshes with the spur gear.

Drive Ratio 1/Drive Ratio 2

These numbers represent the gear ratio of the transmission; vehicles with two-speed transmissions have two drive ratios.

Tires

To accurately calculate speed, BART needs to know the circumference of the tires. All of Traxxas' current tires are loaded into the app. Just select the tires installed on your vehicle.

Battery

Select the battery you use in your vehicle.

Recordings

Replay saved recordings by tapping the name of the recording you wish to play. The dashboard will display the data collected during the recording, including the total and elapsed time of the recording. The Sort button allows you to arrange the recordings by date (most recent will appear at the top of the list) or alphabetically (if you've named your recordings). To delete a recording, slide from right to left over the recording title and a Delete button will appear. Tap it to delete the recording.

Add Gauge

To add a gauge, select what you wish the new gauge to measure: Voltage, Temperature, Speed, or RPM (Tachometer). A variety of gauge designs will appear. Tap the gauge face design you wish to use, and BART will take you back to the dashboard with the new gauge in place.

Steering Channel Setup

The Steering Channel Setup screen allows quick and easy adjustments to the steering servo's Sub-Trim and Endpoints; touch the headings below to expand and learn more.

Sub-Trim

The Sub-Trim function is used to precisely set the neutral point of the steering servo in the event that simply setting the trim to "zero" does not completely center the servo. When selected, Sub-Trim allows finer adjustment to the servo output shaft's position for precise setting of the neutral point. Always set the Steering Trim to zero before making final adjustment (if required) using Sub-Trim.

Left Endpoint/Right Endpoint

The limit of the servo's travel range (or its "end point") can be set independently for left and right travel. This allows you to fine-tune the servo settings to prevent binding caused by the servo moving the steering farther than their mechanical limits.

Normal/Reversed

If moving the transmitter's steering wheel left causes the vehicle to steer to the right (or vice versa), the steering channel's Normal/Reversed setting is incorrect. If "Reversed" is selected, tap "Normal" to correct the steering function, and vice-versa.

Reset Factory Defaults

Tap to return the Sub-trim and Endpoint settings to the original factory settings for the selected model.

Throttle Channel Setup

The Steering Channel Setup screen allows quick and easy adjustments to the steering servo's Sub-Trim and Endpoints; touch the headings below to expand and learn more.

Sub-Trim

The Sub-Trim function is used to precisely set the neutral point of the throttle servo in the event that simply setting the trim to "zero" does not completely center the servo. When selected, Sub-Trim allows finer adjustment to the servo output shaft's position for precise setting of the neutral point. Always set the Throttle Trim to zero before making final adjustment (if required) using Sub-Trim.

Left Endpoint/Right Endpoint

The limit of the throttle servo's travel range (or its "end point") can be set independently for throttle and brake travel. This allows you to fine-tune the servo settings to prevent binding caused by the servo moving steering or throttle linkages (in the case of a nitro car) farther than their mechanical limits.

Normal/Reversed

If pulling the transmitter's trigger to activate forward throttle instead applies the brakes or reverse throttle (or vice versa), the throttle channel's Normal/Reversed setting is incorrect. If "Reversed" is selected, tap "Normal" to correct the throttle function, and vice-versa.

Reset Factory Defaults

Tap to return the Sub-trim and Endpoint settings to the original factory settings for the selected model.

Training Mode

Training Mode allows you to quickly and easily reduce the speed of your model so young, inexperienced, or less-skilled drivers can operate it more easily and safely. To set the Training Mode speed, touch Setup Training Mode and use the Multi Function Knob to set the desired maximum speed. You can operate the model while setting the Training Mode speed. When you have set the speed, touch Enter Training Mode and the model will not exceed the speed you have set. While Training Mode is active, the green LED on the transmitter will flash slowly. To return to normal full-throttle operation, touch Disable Training Mode. When the transmitter is in "normal" mode (Training Mode off), the green LED on the transmitter will glow green.

Vehicle Model Selection

There are two modes of operation for Vehicle Model Selection—Offline and Connected to Transmitter.

Offline Mode—Edit Model from Model History

Make sure you are NOT connected to a transmitter and tap the model you wish to edit offline; a green .check icon will appear next to it. There are two types of models listed in the Model History table—all previously connected models and any new models that the user has created. The last connected or edited model will have a green check next to it indicating that it is the current active model in memory. Any changes within Vehicle Configuration and Dashboards can be made to the active model in memory. These will be applied the next time the model connection is made or the first time newly created models are used. Changes made to Channel Setup and Drive Effects can be saved to a profile that can be loaded the next time the current model in memory is connected.

Offline Mode—Create and Edit New Model

You may want to set up for that new vehicle you are planning to get. To do this, you simply select the desired vehicle from the Model Categories list. Once selected, the vehicle will appear (with a green checkmark next to it) in the Model History List. Any changes within Vehicle Configuration and Dashboards can now be made and these will be applied the first time the newly created model is used. Changes made to Channel Setup and Drive Effects can be saved to a profile that can be loaded when the new model in memory is connected.

Connected Mode—Select Active Model

When connected to a transmitter, the Model Memory displays a list of the models the receiver has been installed in. For example, you may want to move your receiver from one car to another car model or marine model. When you do this, Model Memory remembers all the models that a receiver was used in. Model Memory remembers all the settings for each model that the receiver was used in. Simply move the receiver to the new model, then select the new vehicle from the Model Categories List and make all of your desired changes to the vehicle settings. You may then move the receiver back to the original vehicle and select the correct model from the Model History List. When connected to a transmitter, the Model History List will only show a list of vehicles that the receiver has been used in.

Choose Model

Slide left to locate the model you wish to select. Touch the model to select it. The Edit Vehicle Name window will appear. You may type in a new name for the vehicle, or simply touch "Save." If your transmitter and vehicle are currently "on," the transmitter will disconnect from the vehicle for a moment while the new model is loaded.

Warning Threshold

Programmable warning levels allow [Traxxas BART] to alert you when a limit you set has been exceeded. For example, if battery voltage drops too low, engine temperature is too high, or speed falls below a minimum or exceeds a maximum. To set Warning Levels for analog (dial) gauges, tap the + or . icons to set a warning level, or simply drag the indicator to the position you choose. For digital gauges, tap the value into the field using the numeric keypad.

Screen captures of selected portions of the execution of an exemplary MFED application are shown in FIG. 16A-16AH.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments. In particular, an MFED may provide only a subset of the previously described features. For example, an MFED may display output but not receive input. An MFED may offer a graphical display of operational parameters, but the user may be required to use the parameter user interface of the transmit controller to set the parameters. Alternately, an MFED may be limited to displaying telemetry sensor data, and may have no use in displaying or setting operational parameters.

Various devices consistent with the preceding disclosure may comprise the following:

Device 1: A transmit controller having a maximum power parameter, the transmit controller comprising:
 a memory comprising a maximum power parameter;
 a control user interface for controlling a model vehicle;
 an auxiliary user interface connector for connecting to an auxiliary user interface device;
 a transmit controller processor configured to:
  receive a throttle instruction from the control user interface, the throttle instruction identifying a control user interface acceleration amount;
  reduce the control user interface acceleration amount proportionally to the maximum power parameter, producing an output acceleration amount;
  transmit an output signal to the model vehicle, the output signal identifying the output acceleration amount.

Device 2: Device 1, wherein the transmit controller processor is further configured to reduce the control user interface acceleration amount linearly proportionally to the maximum power parameter, producing the output acceleration amount.

Device 3: Device 1, wherein the transmit controller processor is further configured to:
 receive a maximum power parameter setting from the auxiliary user interface device; and change the maximum power parameter to the maximum power parameter setting.

Device 4: Device 1, further comprising a parameter user interface, wherein the transmit controller processor is further configured to:
receive a maximum power parameter setting from the parameter user interface; and
change the maximum power parameter to the maximum power parameter setting.

Device 5: Device 1, further comprising a parameter user interface, wherein the transmit controller processor is further configured to transmit the maximum power parameter setting to the auxiliary user interface device.

Device 6: An auxiliary user interface device configured to:
receive a maximum power setting from a transmit controller; and
graphically display the maximum power setting.

Device 7: An auxiliary user interface device configured to:
receive a maximum power setting from a graphical user interface user input; and
transmit the maximum power setting to a transmit controller.

Device 8: A transmit controller capable of automatic configuration, the transmit controller comprising:
a memory comprising one or more operational parameters;
a control user interface for controlling a model vehicle;
an auxiliary user interface connector for connecting to an auxiliary user interface device;
a transmit controller processor configured to:
receive a vehicle identifier from a model vehicle receiver;
transmit the vehicle identifier to the auxiliary user interface device;
receive one or more operational parameter settings from the auxiliary user interface device in response to the transmission of the vehicle identifier;
change the one or more operational parameters to the one or more operational parameter settings;
receive a control instruction from the control user interface;
determine an output signal based on the control instruction and the one or more operational parameters; and
transmit the output signal to the model vehicle.

Device 9: An auxiliary user interface device configured to:
receive a vehicle identifier from a transmit controller;
identify one or more operational parameter settings associated with the vehicle identifier in a vehicle database; and
transmit the one or more operational parameter settings to the transmit controller.

Device 10: An auxiliary user interface device configured to:
store one or more operational parameter settings;
transmit the one or more operational parameter settings to a network address at a server; and
send an electronic mail message comprising the network address.

Device 11: Device 10, further configured to open an electronic mail application to a draft of the electronic mail message, the draft of the electronic mail message comprising the network address.

Device 12: An auxiliary user interface device configured to:
receive an electronic mail message comprising the network address of one or more operational parameter settings;
retrieve the one or more operational parameter settings from the network address; and
store the one or more operational parameter settings.

Device 13: An auxiliary user interface device configured to:
receive a sensor identifier from a transmit controller, the sensor identifier identifying a telemetry sensor;
determine, from the sensor identifier, a graphical user interface component for displaying telemetry data from the telemetry sensor;
receive telemetry data from the telemetry sensor;
display the graphical user interface component, the graphical user interface component comprising the telemetry data.

Device 14: Device 13, wherein the auxiliary user interface device being configured to determine, from the sensor identifier, the graphical user interface component comprises the auxiliary user interface device further configured to:
determine, from the sensor identifier, a plurality of graphical user interface components for displaying telemetry data from the telemetry sensor;
display the plurality of graphical user interface components; and
receive a user input identifying the graphical user interface component.

Device 15: An auxiliary user interface device for creating a dashboard video, the auxiliary user interface device configured to:
receive a telemetry data stream from a transmit controller, the telemetry data stream comprising the values of one or more telemetry data items over a time period;
record the telemetry data stream; and
subsequent to the recording of the telemetry data stream, create a graphical representation of the telemetry data stream.

Device 16: Device 15, wherein the graphical representation of the telemetry data stream comprises a video.

Device 17: Device 15, wherein the graphical representation of the telemetry data stream comprises a plurality of graphical user interface components, each of the plurality of graphical user interface components displaying the values of at least one of the one or more telemetry data items over the time period.

Device 18: Device 17, wherein the graphical user interface components are user selected.

Device 19: An auxiliary user interface device for replaying telemetry data, the auxiliary user interface device configured to:
receive a telemetry data stream from a transmit controller, the telemetry data stream comprising the values of one or more telemetry data items over a time period;
record the most recent values of the telemetry data items in a circular buffer;
receive an instruction to display the contents of the circular buffer;
in response to receiving the instruction, record the contents of the circular buffer separately from the circular buffer; and
display a graphical representation of the contents of the circular buffer.

Device 20: Device 19, wherein the graphical representation of the contents of the circular buffer comprises a video.

Device 21: Device 19, wherein the graphical representation of the telemetry data stream comprises a plurality of graphical user interface components, each of the plurality of graphical user interface components displaying the values recorded in the circular buffer of at least one of the one or more telemetry data items.

Device 22: Device 21, wherein the graphical user interface components are user selected.

Device 23: An auxiliary user interface device for updating an application program of a receiving device, the auxiliary user interface device configured to:
receive an updated application program from a data network; and
transmit the updated application program to a model vehicle transmit controller.

Device 24: Device 23, wherein the model vehicle transmit controller is the receiving device.

Device 25: Device 23, wherein the model vehicle transmit controller is configured to transmit the updated application program to the receiving device.

We claim:

1. A transmit controller capable of automatic configuration, the transmit controller comprising:
   a memory comprising one or more operational parameters effecting a control instruction for controlling movement;
   a control user interface for remotely controlling movement of a model vehicle;
   an auxiliary user interface connector for connecting to an auxiliary user interface device, the auxiliary user interface device comprising a processor to automatically configure the transmit controller;
   a transmit controller processor comprising a configuration to:
   receive a vehicle identifier from a model vehicle receiver;
   transmit the vehicle identifier to the auxiliary user interface device;
   receive one or more operational parameter settings from the auxiliary user interface device in response to the transmission of the vehicle identifier;
   change the one or more operational parameters to the one or more operational parameter settings;
   receive the control instruction from the control user interface;
   determine an output signal based on the control instruction and the changed one or more operational parameters; and
   transmit the output signal remotely to the model vehicle to thereby control the movement of the model vehicle.

2. The auxiliary user interface device of claim 1, wherein the one or more operational parameter settings comprises at least one of a steering expo setting and a brake percentage setting.

3. The auxiliary user interface device of claim 1, wherein the one or more operational parameter settings comprises at least one of an end point setting and a servo reversing setting.

4. The transmit controller of claim 1, further comprising:
   the auxiliary user interface device for automatically configuring a transmit controller, the auxiliary user interface device comprising a configuration to:
   receive a vehicle identifier from a transmit controller;
   identify one or more operational parameter settings associated with the vehicle identifier in a vehicle database; and
   transmit the one or more operational parameter settings to the transmit controller.

5. The auxiliary user interface device of claim 4, wherein the one or more operational parameter settings comprises at least one of a steering expo setting and a brake percentage setting.

6. The auxiliary user interface device of claim 4, wherein the one or more operational parameter settings comprises at least one of an end point setting and a servo reversing setting.

7. The transmit controller of claim 1, further comprising:
   the auxiliary user interface device transmitting operational parameter settings, the auxiliary user interface device comprising a configuration to:
   store one or more operational parameter settings;
   transmit the one or more operational parameter settings to a network address at a server; and
   send an electronic mail message comprising the network address.

8. The auxiliary user interface device of claim 7, wherein the one or more operational parameter settings comprises at least one of a model vehicle acceleration configuration, a model vehicle steering configuration, a model vehicle braking configuration.

9. The auxiliary user interface device of claim 7, wherein the configuration is further to open an electronic mail application to a draft of the electronic mail message, the draft of the electronic mail message comprising the network address.

10. The transmit controller of claim 1, further comprising:
    the auxiliary user interface device receiving operational parameter settings, the auxiliary user interface device comprising a configuration to:
    receive an electronic mail message comprising a network address of a network location associated with the one or more operational parameter settings;
    retrieve the one or more operational parameter settings from the network address location; and
    store the one or more operational parameter settings.

11. The auxiliary user interface device of claim 10, wherein the one or more operational parameter settings comprises at least one of a model vehicle acceleration configuration, a model vehicle steering configuration, a model vehicle braking configuration.

12. The auxiliary user interface device of claim 10, wherein the configuration is further to:
    recognize the network address as a network location of one or more operational parameter settings; and
    in response to recognizing the network address, launch an application for operating a model vehicle.

13. The auxiliary user interface device of claim 10, wherein the configuration is further to configure the auxiliary user interface device to use at least some of the one or more operational parameter settings.

14. The auxiliary user interface device of claim 10, wherein the configuration is further to configure a transmit controller to use at least some of the one or more operational parameter settings.

15. The transmit controller of claim 1, further comprising:
    the auxiliary user interface device updating an application program of a receiving device, the auxiliary user interface device comprising a configuration to:
    receive an updated application program from a data network; and
    transmit the updated application program to a model vehicle transmit controller.

16. The auxiliary user interface device of claim 15, wherein the model vehicle transmit controller is the receiving device.

17. The auxiliary user interface device of claim 15, wherein the model vehicle transmit controller is configured to transmit the updated application program to the receiving device.

18. The auxiliary user interface device of claim 15, wherein the configuration is further to communicate with the receiving device through the model vehicle transmit controller.

19. The auxiliary user interface device of claim 15, wherein the configuration is further to send an encoding challenge to the receiving device.

20. The auxiliary user interface device of claim 15, wherein the configuration is further to transmit a downloader program to the model vehicle transmit controller prior to transmitting the updated application program to the model vehicle transmit controller.

\* \* \* \* \*